US012793246B2

(12) United States Patent
Kang et al.

(10) Patent No.: US 12,793,246 B2
(45) Date of Patent: Nov. 10, 2026

(54) SIMULTANEOUS LOCALIZATION AND MAPPING USING CAMERAS CAPTURING MULTIPLE SPECTRA OF LIGHT

(71) Applicant: QUALCOMM Incorporated, San Diego, CA (US)

(72) Inventors: Xueyang Kang, Taiyuan (CN); Lei Xu, Beijing (CN); Yanming Zou, Beijing (CN); Hao Xu, Beijing (CN); Lei Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 18/004,795

(22) PCT Filed: Oct. 1, 2020

(86) PCT No.: PCT/CN2020/119769

§ 371 (c)(1),
(2) Date: Jan. 9, 2023

(87) PCT Pub. No.: WO2022/067836

PCT Pub. Date: Apr. 7, 2022

(65) Prior Publication Data

US 2023/0177712 A1 Jun. 8, 2023

(51) Int. Cl.
*G06T 7/579* (2017.01)
*G06T 7/13* (2017.01)
(Continued)

(52) U.S. Cl.
CPC ................ *G06T 7/579* (2017.01); *G06T 7/13* (2017.01); *G06T 7/246* (2017.01); *G06T 7/70* (2017.01);
(Continued)

(58) Field of Classification Search
CPC G06T 7/579; G06T 7/246; G06T 7/13; G06T 7/70; G06T 17/05;
(Continued)

(56) References Cited

U.S. PATENT DOCUMENTS 8,073,243 B2 * 12/2011 Mareachen ............ H04N 19/20 382/173
8,810,138 B2 * 8/2014 Reed ...................... H05B 47/11 362/276
(Continued)

FOREIGN PATENT DOCUMENTS

CN 107204015 A 9/2017
CN 107729893 A 2/2018
(Continued)

OTHER PUBLICATIONS

Eso; Elizabeth et al. "Towards Autonomous Optical Camera Communications: Light Source Localisation Using Deep Learning", Feb. 2026, MDPI (Year: 2026).*
(Continued)

*Primary Examiner* — John Villecco
*Assistant Examiner* — Alejandro Hernandez
(74) *Attorney, Agent, or Firm* — QUALCOMM Incorporated

(57) ABSTRACT

A device is described that performs an image processing technique. The device includes a first camera and a second camera, which are responsive to distinct spectra of light, such as the visible light spectrum and the infrared spectrum. While the device is in a first position in an environment, the first camera captures a first image of the environment, and the second camera captures a second image of the environment. The device determines a single set of coordinates for the feature based on depictions of the feature identified in both the first image and in the second image. The device
(Continued)

generates and/or updates a map of the environment based on the set of coordinates for the feature. The device can move to other positions in the environment and continue to capture images and update the map based on the images.

53 Claims, 19 Drawing Sheets

(51) Int. Cl.
*G06T 7/246* (2017.01)
*G06T 7/70* (2017.01)
*G06T 17/05* (2011.01)
*G06V 10/60* (2022.01)

(52) U.S. Cl.
CPC .............. *G06T 17/05* (2013.01); *G06V 10/60* (2022.01); *G06T 2207/10012* (2013.01); *G06T 2207/10048* (2013.01); *G06T 2207/30244* (2013.01)

(58) Field of Classification Search
CPC . G06T 2207/10012; G06T 2207/10048; G06T 2207/30244; G06T 7/73; G06T 7/55; G06T 19/006; G06T 7/80; G06T 5/73; G06T 15/50; G06T 7/285; G06T 7/593; G06T 2207/10021; G06T 2207/10024; G06T 3/4038; G06T 15/506; G06V 10/60; G06V 10/764; G06V 10/82; G06V 20/50; G06V 20/52; G06V 10/26; G06V 10/22; G06F 3/011; G06F 3/01; G06F 3/012; G06F 3/0304; G06F 3/0317; G01S 17/89; G01S 17/88; G01C 11/04; G01C 11/06; G01C 21/005; G01C 21/30; G06K 9/00624
See application file for complete search history.

(56) References Cited

U.S. PATENT DOCUMENTS 9,836,655 B2 * 12/2017 Hao .................... G06T 7/246
10,402,662 B2 9/2019 Kozicz et al.
10,620,717 B2 * 4/2020 McCulloch ............. G06F 3/017
10,762,652 B2 * 9/2020 Price .................... G01S 17/66
11,561,102 B1 * 1/2023 Ebrahimi Afrouzi .................... G05D 1/0272
11,688,089 B2 * 6/2023 Islam .................... B25J 9/1697 348/42
12,198,489 B2 * 1/2025 Ranganath ............... G07C 9/10
12,313,427 B2 * 5/2025 Ito .................... G01C 21/3844
12,449,502 B2 * 10/2025 Finlay .................... G01S 17/48
2003/0076996 A1 * 4/2003 Neumann .............. G03B 15/00 345/581
2004/0167670 A1 * 8/2004 Goncalves ........... G05D 1/0246 700/259
2011/0254942 A1 * 10/2011 Suzuki .................. G06V 40/16 348/E7.087
2013/0240735 A1 * 9/2013 Yen .................... H04N 23/21 250/340
2014/0267700 A1 * 9/2014 Wang .................... G01C 15/00 348/135
2015/0109418 A1 * 4/2015 Lin .................... G06T 7/80 348/47
2015/0371088 A1 * 12/2015 Hao .................... G06T 7/246 382/103
2016/0004916 A1 * 1/2016 Zheng .................. G06V 20/588 382/103
2016/0156839 A1 * 6/2016 Shimura ............ G08B 21/0476 348/159
2017/0154429 A1 * 6/2017 Moteki .................... G06T 7/74
2017/0374342 A1 12/2017 Zhao
2018/0001821 A1 * 1/2018 Natroshvili ............. G06T 7/251
2018/0004308 A1 * 1/2018 McCulloch ........... G06F 3/0346
2018/0089851 A1 * 3/2018 Kuo .................... G01B 11/002
2018/0170373 A1 * 6/2018 Kwon ................. B60W 30/143
2018/0211399 A1 * 7/2018 Lee .................... G06T 7/529
2018/0218513 A1 * 8/2018 Ho .................... G06T 7/579
2018/0268237 A1 9/2018 Stanimirovic et al.
2018/0286065 A1 * 10/2018 Knorr .................... G06T 7/277
2019/0130579 A1 * 5/2019 Heo .................. G02B 27/0093
2019/0149752 A1 * 5/2019 Takahashi ............ H04N 23/617 348/222.1
2019/0294889 A1 * 9/2019 Sriram ............... G06V 10/7625
2019/0297312 A1 9/2019 Price et al.
2019/0340785 A1 * 11/2019 Lopich ..................... G06T 5/50
2019/0392606 A1 * 12/2019 Hisada ................ G06F 16/5854
2020/0043187 A1 2/2020 Guo et al.
2020/0050205 A1 * 2/2020 McClelland ........... G01C 21/20
2020/0111233 A1 * 4/2020 Thyagharajan ........... G06T 7/73
2020/0250850 A1 * 8/2020 Chakravarty ........... G06T 7/579
2020/0254930 A1 * 8/2020 Schmalenberg ....... H04N 23/56
2020/0257940 A1 * 8/2020 Leung .................... G06V 20/52
2020/0327678 A1 * 10/2020 Wang .................. G06V 10/267
2020/0333789 A1 * 10/2020 Suzuki ................. G05D 1/0212
2020/0372285 A1 * 11/2020 Adams ................. G06V 20/582
2020/0372626 A1 * 11/2020 Dal Mutto .............. G06T 17/00
2021/0084240 A1 * 3/2021 Mao ......................... H04N 7/18
2021/0117651 A1 * 4/2021 Kotake .................... G06N 3/08
2021/0248358 A1 * 8/2021 Lee ...................... G06F 18/214
2021/0334487 A1 * 10/2021 Wilfred .................. G06V 20/52
2022/0005332 A1 * 1/2022 Metzler ........... G08B 13/19613
2022/0198677 A1 * 6/2022 Bisain .................... G06T 7/174
2022/0245832 A1 * 8/2022 Gupte .................... G06T 7/246
2022/0414925 A1 * 12/2022 Parian ................. G06V 20/647
2023/0095621 A1 * 3/2023 Gorur .................... G06V 20/46 382/103
2023/0292015 A1 * 9/2023 Hoch .................... G06V 20/10
2024/0386577 A1 * 11/2024 Wang ........................ G06T 7/20
2024/0404177 A1 * 12/2024 Da Veiga ............. G06T 19/006
2024/0418531 A1 * 12/2024 Okuma ............. G01C 21/3833
2024/0420354 A1 * 12/2024 Kappi ....................... G06T 7/55
2025/0068374 A1 * 2/2025 Ajanohoun ........... G06F 3/1454
2025/0076964 A1 * 3/2025 Raitarovskyi ........... G06T 7/246
2025/0238951 A1 * 7/2025 Manfredi .................. G06T 7/70
2025/0245924 A1 * 7/2025 Sato .......................... G06T 7/70
2025/0272788 A1 * 8/2025 Gaidon ...................... G06T 7/50
2025/0321649 A1 * 10/2025 Bosworth .......... G02B 27/0093

FOREIGN PATENT DOCUMENTS

CN 110275602 A 9/2019
CN 110702111 A 1/2020
CN 110827340 A * 2/2020 ............... G06T 7/55
WO 2019196476 A1 10/2019

OTHER PUBLICATIONS

International Search Report and Written Opinion—PCT/CN2020/119769—ISA/EPO—Jun. 28, 2021.
Felicio M.G., et al., "Fusion of Visible and Thermal-Infrared Imagery For SLAM for Landing on Icy Moons", NASA Technical Reports Server, Feb. 1, 2019, 48 Pages, XP093163180, abstract, section 3, figures 1, 2.
Rydell J., et al., "Chameleon V2: Improved Imaging-Inertial Indoor Navigation", GNSS 2013—Proceedings of the 26th International Technical Meeting of the Satellite Division of the Institute of Navigation (ION GNSS+ 2013), The Institute of Navigation, 8551 Rixlew Lane Suite 360 Manassas, VA 20109, USA, Sep. 20, 2013, pp. 737-745, XP056007328, abstract, section 3, section 4, figures 3, 4, 6.
Supplementary European Search Report—EP20955856—Search Authority—The Hague—Jun. 3, 2024.
Zhang Z., et al., "A VSLAM Fusing Visible Images and Infrared Images from RGB-D Camera for Indoor Mobile Robot", 2018 IEEE CSAA Guidance, Navigation and Control Conference (CGNCC), IEEE, Aug. 10, 2018, 4 Pages, XP033729788, abstract, section I, section II, section III, section IV, equation 2, equation 4.

(56) References Cited

OTHER PUBLICATIONS

Zhang Z., et al., "A VSLAM Fusing Visible Images and Infrared Images from RGB-D Camera for Indoor Mobile Robot", 2018 IEEE CSAA Guidance, Navigation and Control Conference (CGNCC), Aug. 10-12, 2018, Aug. 10, 2018, 4 Pages.

Ling Y., et al., "RGB-D Inertial Odometry for Indoor Robot via Keyframe-based Nonlinear Optimization", Proceedings of 2018 IEEE International Conference on Mechatronics and Automation, ICMA, Aug. 8, 2018, pp. 973-979.

* cited by examiner

SIMULTANEOUS LOCALIZATION AND MAPPING USING CAMERAS CAPTURING MULTIPLE SPECTRA OF LIGHT

FIELD

This application is related to image processing. More specifically, this application relates to technologies and techniques for simultaneous localization and mapping (SLAM) using a first camera capturing a first spectrum of light and a second camera capturing a second spectrum of light.

BACKGROUND

Simultaneous localization and mapping (SLAM) is a computational geometry technique used in devices such as robotics systems and autonomous vehicle systems. In SLAM, a device constructs and updates a map of an unknown environment. The device can simultaneously keep track of the device's location within that environment. The device generally performs mapping and localization based on sensor data collected by one or more sensors on the device. For example, the device can be activated in a particular room of a building and can move throughout the interior of the building, capturing sensor measurements. The device can generate and update a map of the interior of the building as it moves throughout the interior of the building based on the sensor measurements. The device can track its own location in the map as the device moves throughout the interior of the building and develops the map. Visual SLAM (VSLAM) is a SLAM technique that performs mapping and localization based on visual data collected by one or more cameras of a device. Different types of cameras can capture images based on different spectra of light, such as the visible light spectrum or the infrared light spectrum. Some cameras are disadvantageous to use in certain environments or situations.

SUMMARY

Systems, apparatuses, methods, and computer-readable media (collectively referred to herein as "systems and techniques") are described herein for performing visual simultaneous localization and mapping (VSLAM) using a device with multiple cameras. The device performs mapping of an environment and localization of itself within the environment based on visual data (and/or other data) collected by the cameras of the device as the device moves throughout the environment. The cameras can include a first camera that captures images by receiving light from a first spectrum of light and a second camera that captures images by receiving light from a second spectrum of light. For example, the first spectrum of light can be the visible light spectrum, and the second spectrum of light can be the infrared light spectrum. Different types of cameras can provide advantages in certain environments and disadvantages in others. For example, visible light cameras can capture clear images in well-illuminated environments, but are sensitive to changes in illumination. VSLAM can fail using only visible light cameras when the environment is poorly-illuminated or when illumination changes over time (e.g., when illumination is dynamic and/or inconsistent). Performing VSLAM using cameras capturing multiple spectra of light can retain advantages of each of the different types of cameras while mitigating disadvantages of each of the different types of cameras. For instance, the first camera and the second camera of the device can both capture images of the environment, and depictions of a feature in the environment can appear in both images. The device can generate a set of coordinates for the feature based on these depictions of the feature, and can update a map of the environment based on the set of coordinates for the feature. In situations where one of the cameras is at a disadvantage, the disadvantaged camera can be disabled. For instance, a visible light camera can be disabled if an illumination level of the environment falls below an illumination threshold.

In another example, an apparatus for image processing is provided. The apparatus includes one or more memory units storing instructions. The apparatus includes one or more processors that execute the instructions, wherein execution of the instructions by the one or more processors causes the one or more processors to perform a method. The method includes receiving a first image of an environment captured by a first camera. The first camera is responsive to a first spectrum of light. The method includes receiving a second image of the environment captured by a second camera. The second camera is responsive to a second spectrum of light. The method includes identifying that a feature of the environment is depicted in both the first image and the second image. The method includes determining a set of coordinates of the feature based on a first depiction of the feature in the first image and a second depiction of the feature in the second image. The method includes updating a map of the environment based on the set of coordinates for the feature.

In one example, a method of image processing is provided. The method includes receiving image data captured by an image sensor. The method includes receiving a first image of an environment captured by a first camera. The first camera is responsive to a first spectrum of light. The method includes receiving a second image of the environment captured by a second camera. The second camera is responsive to a second spectrum of light. The method includes identifying that a feature of the environment is depicted in both the first image and the second image. The method includes determining a set of coordinates of the feature based on a first depiction of the feature in the first image and a second depiction of the feature in the second image. The method includes updating a map of the environment based on the set of coordinates for the feature.

In another example, an non-transitory computer readable storage medium having embodied thereon a program is provided. The program is executable by a processor to perform a method of image processing. The method includes receiving a first image of an environment captured by a first camera. The first camera is responsive to a first spectrum of light. The method includes receiving a second image of the environment captured by a second camera. The second camera is responsive to a second spectrum of light. The method includes identifying that a feature of the environment is depicted in both the first image and the second image. The method includes determining a set of coordinates of the feature based on a first depiction of the feature in the first image and a second depiction of the feature in the second image. The method includes updating a map of the environment based on the set of coordinates for the feature.

In another example, an apparatus for image processing is provided. The apparatus includes means for receiving a first image of an environment captured by a first camera, the first camera responsive to a first spectrum of light. The apparatus includes means for receiving a second image of the environment captured by a second camera, the second camera responsive to a second spectrum of light. The apparatus includes means for identifying that a feature of the environment is depicted in both the first image and the second image. The apparatus includes means for determining a set of coordinates of the feature based on a first depiction of the feature in the first image and a second depiction of the feature in the second image. The apparatus includes means for updating a map of the environment based on the set of coordinates for the feature.

In some aspects, the first spectrum of light is at least part of a visible light (VL) spectrum, and the second spectrum of light is distinct from the VL spectrum. In some aspects, the second spectrum of light is at least part of an infrared (IR) light spectrum, and wherein the first spectrum of light is distinct from the IR light spectrum.

In some aspects, the set of coordinates of the feature includes three coordinates corresponding to three spatial dimensions. In some aspects, a device or apparatus includes the first camera and the second camera. In some aspects, the device or apparatus includes at least one of a mobile handset, a head-mounted display (HMD), a vehicle, and a robot.

In some aspects, the first camera captures the first image while the device or apparatus is in a first position, and wherein the second camera captures the second image while the device or apparatus is in the first position. In some aspects, the methods, apparatuses, and computer-readable medium described above further comprise: determining, based on the set of coordinates for the feature, a set of coordinates of the first position of the device or apparatus within the environment. In some aspects, the methods, apparatuses, and computer-readable medium described above further comprise: determining, based on the set of coordinates for the feature, a pose of the device or apparatus while the device or apparatus is in the first position, wherein the pose of the device or apparatus includes at least one of a pitch of the device or apparatus, a roll of the device or apparatus, and a yaw of the device or apparatus.

In some aspects, the methods, apparatuses, and computer-readable medium described above further comprise: identifying that the device or apparatus has moved from the first position to a second position; receiving a third image of the environment captured by the second camera while the device or apparatus is in the second position; identifying that the feature of the environment is depicted in at least one of the third image and a fourth image from the first camera; and tracking the feature based on one or more depictions of the feature in at least one of the third image and the fourth image. In some aspects, the methods, apparatuses, and computer-readable medium described above further comprise: determining, based on tracking the feature, a set of coordinates of the second position of the device or apparatus within the environment. In some aspects, the methods, apparatuses, and computer-readable medium described above further comprise: determine, based on tracking the feature, a pose of the apparatus while the device or apparatus is in the second position, wherein the pose of the device or apparatus includes at least one of a pitch of the device or apparatus, a roll of the device or apparatus, and a yaw of the device or apparatus. In some aspects, the methods, apparatuses, and computer-readable medium described above further comprise: generating an updated set of coordinates of the feature in the environment by updating the set of coordinates of the feature in the environment based on tracking the feature; and updating the map of the environment based on the updated set of coordinates of the feature.

In some aspects, the methods, apparatuses, and computer-readable medium described above further comprise: identifying that an illumination level of the environment is above a minimum illumination threshold while the device or apparatus is in the second position; and receiving the fourth image of the environment captured by the first camera while the device or apparatus is in the second position, wherein tracking the feature is based on a third depiction of the feature in the third image and on a fourth depiction of the feature in the fourth image. In some aspects, the methods, apparatuses, and computer-readable medium described above further comprise: identifying that an illumination level of the environment is below a minimum illumination threshold while the device or apparatus is in the second position, wherein tracking the feature is based on a third depiction of the feature in the third image. In some aspects, the methods, apparatuses, and computer-readable medium described above further comprise: wherein tracking the feature is also based on at least one of the set of coordinates of the feature, the first depiction of the feature in the first image, and the second depiction of the feature in the second image.

In some aspects, the methods, apparatuses, and computer-readable medium described above further comprise: identifying that the device or apparatus has moved from the first position to a second position; receiving a third image of the environment captured by the second camera while the device or apparatus is in the second position; identifying that a second feature of the environment is depicted in at least one of the third image and a fourth image from the first camera; determining a second set of coordinates for the second feature based on one or more depictions of the second feature in at least one of the third image and the fourth image; and updating the map of the environment based on the second set of coordinates for the second feature. In some aspects, the methods, apparatuses, and computer-readable medium described above further comprise: determining, based on updating the map, a set of coordinates of the second position of the device or apparatus within the environment. In some aspects, the methods, apparatuses, and computer-readable medium described above further comprise: determining, based on updating the map, a pose of the device or apparatus while the device or apparatus is in the second position, wherein the pose of the device or apparatus includes at least one of a pitch of the device or apparatus, a roll of the device or apparatus, and a yaw of the device or apparatus.

In some aspects, the methods, apparatuses, and computer-readable medium described above further comprise: identifying that an illumination level of the environment is above a minimum illumination threshold while the device or apparatus is in the second position; and receiving the fourth image of the environment captured by the first camera while the device or apparatus is in the second position, wherein determining the second set of coordinates of the second feature is based on a first depiction of the second feature in the third image and on a second depiction of the second feature in the fourth image. In some aspects, the methods, apparatuses, and computer-readable medium described above further comprise: identifying that an illumination level of the environment is below a minimum illumination threshold while the device or apparatus is in the second position, wherein determining the second set of coordinates for the second feature is based on a first depiction of the second feature in the third image.

In some aspects, determining the set of coordinates for the feature includes determining a transformation between a first set of coordinates for the feature corresponding to the first image and a second set of coordinates for the feature corresponding to the second image. In some aspects, the methods, apparatuses, and computer-readable medium described above further comprise: generating the map of the environment before updating the map of the environment. In some aspects, updating the map of the environment based on the set of coordinates for the feature includes adding a new map area to the map, the new map area including the set of coordinates for the feature. In some aspects, updating the map of the environment based on the set of coordinates for the feature includes revising a map area of the map, the map area including the set of coordinates for the feature. In some aspects, the feature is at least one of an edge and a corner.

In some aspects, the device or apparatus comprises a camera, a mobile device or device or apparatus (e.g., a mobile telephone or so-called "smart phone" or other mobile device or device or apparatus), a wireless communication device or device or apparatus, a mobile handset, a wearable device or device or apparatus, a head-mounted display (HMD), an extended reality (XR) device or device or apparatus (e.g., a virtual reality (VR) device or device or apparatus, an augmented reality (AR) device or device or apparatus, or a mixed reality (MR) device or device or apparatus), a robot, a vehicle, an unmanned vehicle, an autonomous vehicle, a personal computer, a laptop computer, a server computer, or other device or device or apparatus. In some aspects, the one or more processors include an image signal processor (ISP). In some aspects, the device or apparatus includes the first camera. In some aspects, the device or apparatus includes the second camera. In some aspects, the device or apparatus includes one or more additional cameras for capturing one or more additional images. In some aspects, the device or apparatus includes an image sensor that captures image data corresponding to the first image, the second image, and/or one or more additional images. In some aspects, the device or apparatus further includes a display for displaying the first image, the second image, another image, the map, one or more notifications associated with image processing, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
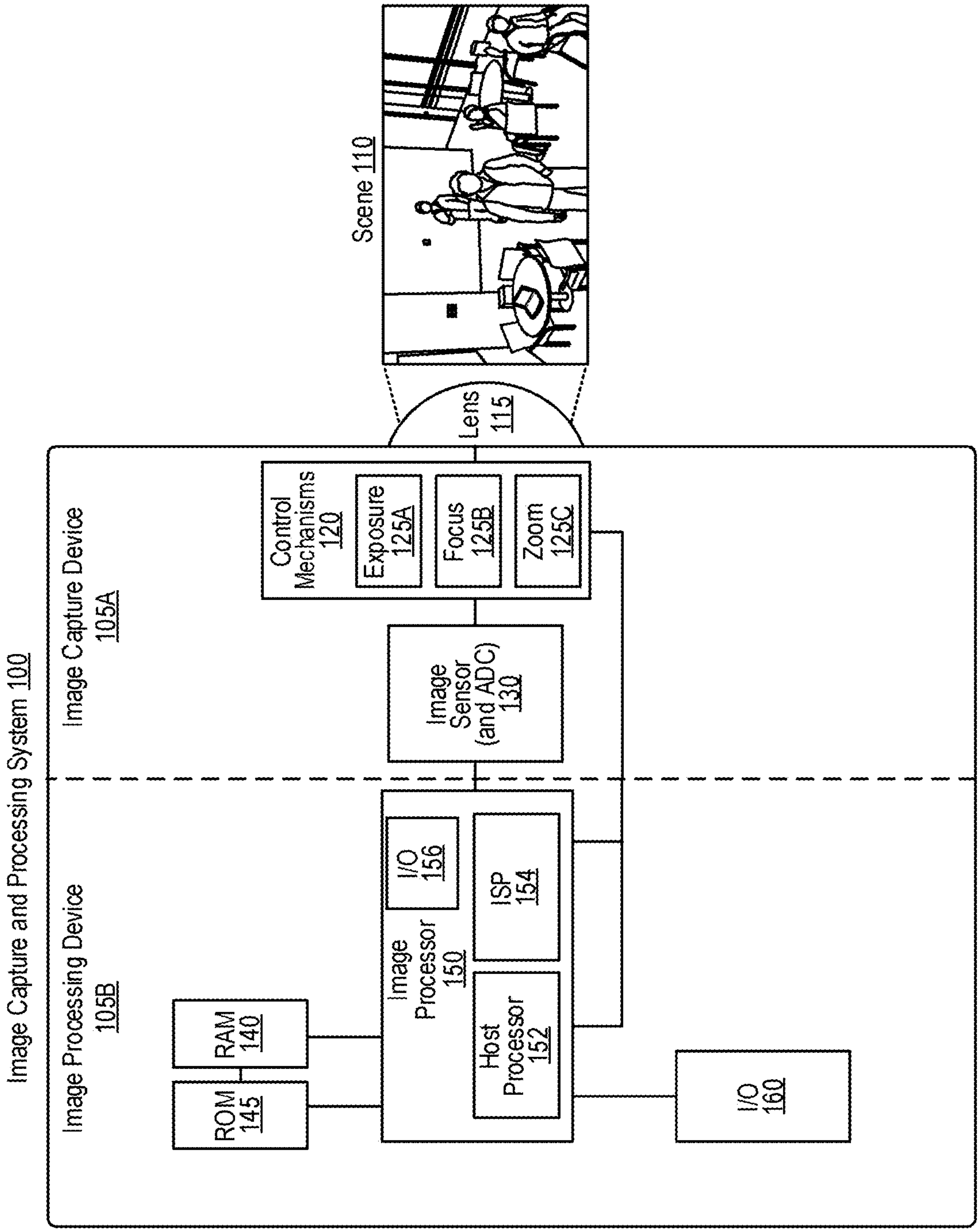
FIG. 1 is a block diagram illustrating an example of an architecture of an image capture and processing device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Simultaneous localization and mapping (SLAM) is a computational geometry technique used in devices such as robotics systems, autonomous vehicle systems, extended reality (XR) systems, head-mounted displays (HMD), among others. As noted above, XR systems can include, for instance, augmented reality (AR) systems, virtual reality (VR) systems, and mixed reality (MR) systems. XR systems can be head-mounted display (HMD) devices. Using SLAM, a device can construct and update a map of an unknown environment while simultaneously keeping track of the device's location within that environment. The device can generally perform these tasks based on sensor data collected by one or more sensors on the device. For example, the device may be activated in a particular room of a building, and may move throughout the building, mapping the entire interior of the building while tracking its own location within the map as the device develops the map.

Visual SLAM (VSLAM) is a SLAM technique that performs mapping and localization based on visual data collected by one or more cameras of a device. In some cases, a monocular VSLAM device can perform VLAM using a single camera. For example, the monocular VSLAM device can capture one or more images of an environment with the camera and can determine distinctive visual features, such as corner points or other points in the one or more images. The device can move through the environment and can capture more images. The device can track movement of those features in consecutive images captured while the device is at different positions, orientations, and/or poses in the environment. The device can use these tracked features to generate a three-dimensional (3D) map and determine its own positioning within the map.

VSLAM can be performed using visible light (VL) cameras that detect light within the light spectrum visible to the human eye. Some VL cameras detect only light within the light spectrum visible to the human eye. An example of a VL camera is a camera that captures red (R), green (G), and blue (B) image data (referred to as RGB image data). The RGB image data can then be merged into a full-color image. VL cameras that capture RGB image data may be referred to as RGB cameras. Cameras can also capture other types of color images, such as images having luminance (Y) and Chrominance (Chrominance blue, referred to as U or Cb, and Chrominance red, referred to as V or Cr) components. Such images can include YUV images, $YC_bC_r$ images, etc.

VL cameras generally capture clear images of well-illuminated environments. Features such as edges and corners are easily discernable in clear images of well-illuminated environments. However, VL cameras generally have trouble capturing clear images of poorly-illuminated environments, such as environments photographed during nighttime and/or with dim lighting. Images of poorly-illuminated environments captured by VL cameras can be unclear. For example, features such as edges and corners can be difficult or even impossible to discern in unclear images of poorly-illuminated environments. VSLAM devices using VL cameras can fail to detect certain features in a poorly-illuminated environment that the VSLAM devices might detect if the environment was well-illuminated. In some cases, because an environment can look different to a VL camera depending on illumination of the environment, a VSLAM device using a VL camera can sometimes fail to recognize portions of an environment that the VSLAM device has already observed due to a change in lighting conditions in the environment. Failure to recognize portions of the environment that a VSLAM device has already observed can cause errors in localization and/or mapping by the VSLAM device.

As described in more detail below, systems and techniques are described herein for performing VSLAM using a VSLAM device with multiple types of cameras. For example, the systems and techniques can perform VSLAM using a VSLAM device including a VL camera and an infrared (IR) camera (or multiple VL cameras and/or multiple IR cameras). The VSLAM device can capture one or more images of an environment using the VL camera and can capture one or more images of the environment using the IR camera. In some examples, the VSLAM device can detect one or more features in the VL image data from the VL camera and in the IR image data from the IR camera. The VSLAM device can determine a single set of coordinates (e.g., three-dimensional coordinates) for a feature of the one or more features based on the depictions of the feature in the VL image data and in the IR image data. The VSLAM device can generate and/or update a map of the environment based on the set of coordinates for the feature.

Further details regarding the systems and techniques are provided herein with respect to various figures. FIG. 1 is a block diagram illustrating an example of an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1810 discussed with respect to the computing device 1800. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1020, read-only memory (ROM) 145/1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1835, any other input devices 1845, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some cases, the image capture and processing system 100 can be part of or implemented by a device that can perform VSLAM (referred to as a VSLAM device). For example, a VSLAM device may include one or more image capture and processing system(s) 100, image capture system(s) 105A, image processing system(s) 105B, computing system(s) 1800, or any combination thereof. For example, a VSLAM device can include a visible light (VL) camera and an infrared (IR) camera. The VL camera and the IR camera can each include at least one of the image capture and processing system 100, the image capture device 105A, the image processing device 105B, a computing system 1800, or some combination thereof.

Figure 2:
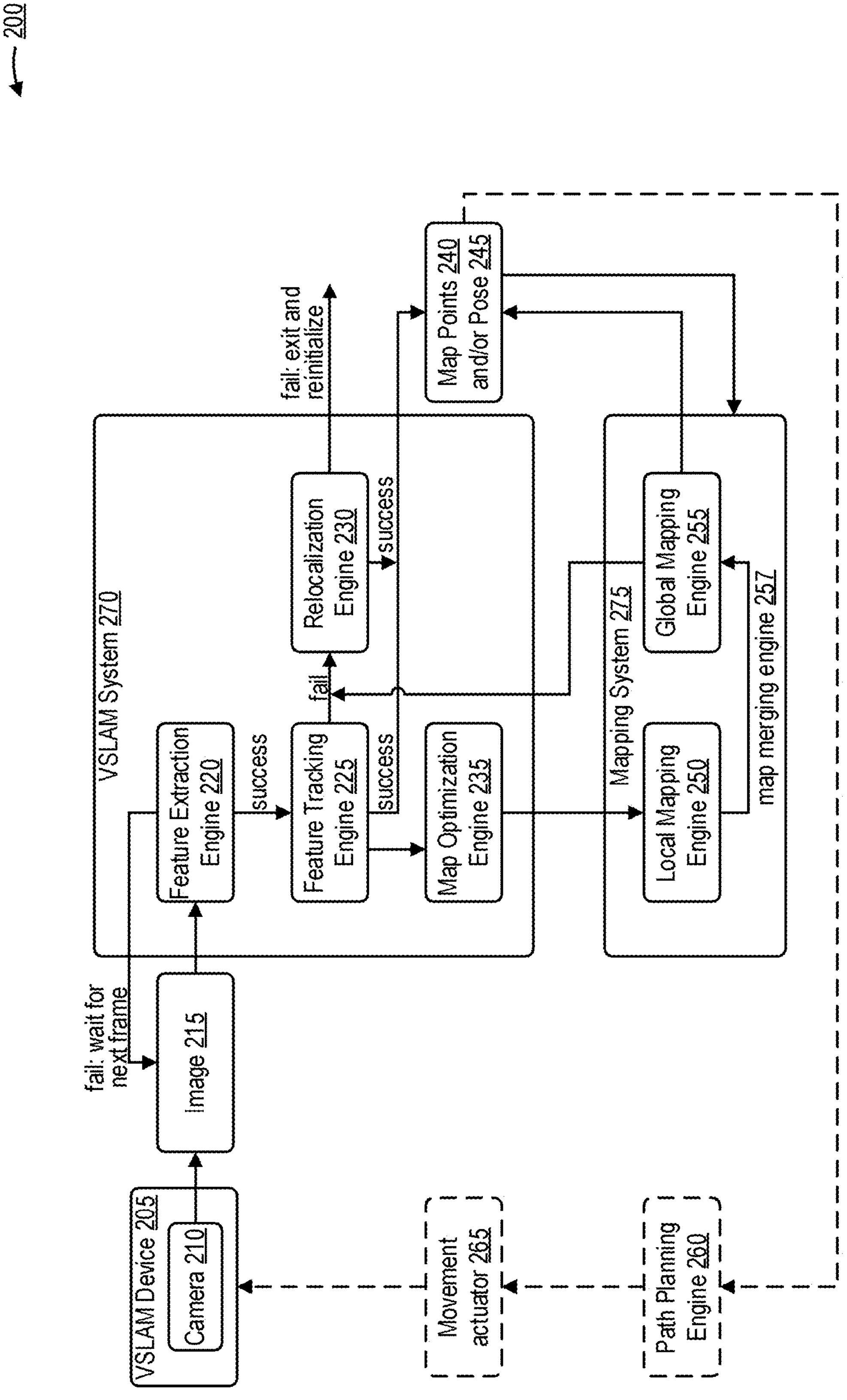
FIG. 2 is a conceptual diagram illustrating an example of a technique for performing visual simultaneous localization and mapping (VSLAM) using a camera of a VSLAM device, in accordance with some examples.

FIG. 2 is a conceptual diagram 200 illustrating an example of a technique for performing visual simultaneous localization and mapping (VSLAM) using a camera 210 of a VSLAM device 205. In some examples, the VSLAM device 205 can be a virtual reality (VR) device, an augmented reality (AR) device, a mixed reality (MR) device, an extended reality (XR) device, a head-mounted display (HMD), or some combination thereof. In some examples, the VSLAM device 205 can be a wireless communication device, a mobile device (e.g., a mobile telephone or so-called "smart phone" or other mobile device), a wearable device, an extended reality (XR) device (e.g., a virtual reality (VR) device, an augmented reality (AR) device, or a mixed reality (MR) device), a head-mounted display (HMD), a personal computer, a laptop computer, a server computer, an unmanned ground vehicle, an unmanned aerial vehicle, an unmanned aquatic vehicle, an unmanned underwater vehicle, an unmanned vehicle, an autonomous vehicle, a vehicle, a robot, any combination thereof, and/or other device.

The VSLAM device 205 includes a camera 210. The camera 210 may be responsive to light from a particular spectrum of light. The spectrum of light may be a subset of the electromagnetic (EM) spectrum. For example, the camera 210 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof. In some cases, the camera 210 may be a near-infrared (NIR) camera responsive to aNIR spectrum. The NIR spectrum may be a subset of the IR spectrum that is near and/or adjacent to the VL spectrum.

The camera 210 can be used to capture one or more images, including an image 215. A VSLAM system 270 can perform feature extraction using a feature extraction engine 220. The feature extraction engine 220 can use the image 215 to perform feature extraction by detecting one or more features within the image. The features may be, for example, edges, corners, areas where color changes, areas where luminosity changes, or combinations thereof. In some cases, feature extraction engine 220 can fail to perform feature extraction for an image 215 when the feature extraction engine 220 fails to detect any features in the image 215. In some cases, feature extraction engine 220 can fail when it fails to detect at least a predetermined minimum number of features in the image 215. If the feature extraction engine 220 fails to successfully perform feature extraction for the image 215, the VSLAM system 270 does not proceed further, and can wait for the next image frame captured by the camera 210.

The feature extraction engine 220 can succeed in perform feature extraction for an image 215 when the feature extraction engine 220 detects at least a predetermined minimum number of features in the image 215. In some examples, the predetermined minimum number of features can be one, in which case the feature extraction engine 220 succeeds in performing feature extraction by detecting at least one feature in the image 215. In some examples, the predetermined minimum number of features can be greater than one, and can for example be 2, 3, 4, 5, 10, 15, 20, 25, 30, 35, 40, 45, 50, 55, 60, 65, 70, 75, 80, 85, 90, 95, 100, a number greater than 100, or a number between any two previously listed numbers. Images with one or more features depicted clearly may be maintained in a map database as keyframes, whose depictions of the features may be used for tracking those features in other images.

The VSLAM system 270 can perform feature tracking using a feature tracking engine 225 once the feature extraction engine 220 succeeds in performing feature extraction for one or more images 215. The feature tracking engine 225 can perform feature tracking by recognizing features in the image 215 that were already previously recognized in one or more previous images. The feature tracking engine 225 can also track changes in one or more positions of the features between the different images. For example, the feature extraction engine 220 can detect a particular person's face as a feature depicted in a first image. The feature extraction engine 220 can detect the same feature (e.g., the same person's face) depicted in a second image captured by and received from the camera 210 after the first image. Feature tracking 225 can recognize that these features detected in the first image and the second image are two depictions of the same feature (e.g., the same person's face). The feature tracking engine 225 can recognize that the feature has moved between the first image and the second image. For instance, the feature tracking engine 225 can recognize that the feature is depicted on the right-hand side of the first image, and is depicted in the center of the second image.

Movement of the feature between the first image and the second image can be caused by movement of a photographed object within the photographed scene between capture of the first image and capture of the second image by the camera 210. For instance, if the feature is a person's face, the person may have walked across a portion of the photographed scene between capture of the first image and capture of the second image by the camera 210, causing the feature to be in a different position in the second image than in the first image. Movement of the feature between the first image and the second image can be caused by movement of the camera 210 between capture of the first image and capture of the second image by the camera 210. In some examples, the VSLAM device 205 can be a robot or vehicle, and can move itself and/or its camera 210 between capture of the first image and capture of the second image by the camera 210. In some examples, the VSLAM device 205 can be a head-mounted display (HMD) (e.g., an XR headset) worn by a user, and the user may move his or her head and/or body between capture of the first image and capture of the second image by the camera 210.

The VSLAM system 270 may identify a set of coordinates, which may be referred to as a map point, for each feature identified by the VSLAM system 270 using the feature extraction engine 220 and/or the feature tracking engine 225. The set of coordinates for each feature may be used to determine map points 240. The local map engine 250 can use the map points 240 to update a local map. The local map may be a map of a local region of the map of the environment. The local region may be a region in which the VSLAM device 205 is currently located. The local region may be, for example, a room or set of rooms within an environment. The local region may be, for example, the set of one or more rooms that are visible in the image 215. The set of coordinates for a map point corresponding to a feature may be updated to increase accuracy by the VSLAM system 270 using the map optimization engine 235. For instance, by tracking a feature across multiple images captured at different times, the VSLAM system 270 can generate a set of coordinates for the map point of the feature from each image. An accurate set of coordinates can be determined for the map point of the feature by triangulating or generating average coordinates based on multiple map points for the feature determined from different images. The map optimization 235 engine can update the local map using the local mapping engine 250 to update the set of coordinates for the feature to use the accurate set of coordinates that are determined using triangulation and/or averaging. Observing the same feature from different angles can provide additional information about the true location of the feature, which can be used to increase accuracy of the map points 240.

The local map 250 may be part of a mapping system 275 along with a global map 255. The global map 255 may map a global region of an environment. The VSLAM device 205 can be positioned in the global region of the environment and/or in the local region of the environment. The local region of the environment may be smaller than the global region of the environment. The local region of the environment may be a subset of the global region of the environment. The local region of the environment may overlap with the global region of the environment. In some cases, the local region of the environment may include portions of the environment that are not yet merged into the global map by the map merging engine 257 and/or the global mapping engine 255. In some examples, the local map may include map points within such portions of the environment that are not yet merged into the global map. In some cases, the global map 255 may map all of an environment that the VSLAM device 205 has observed. Updates to the local map by the local mapping engine 250 may be merged into the global map using the map merging engine 257 and/or the global mapping engine 255, thus keeping the global map up to date. In some cases, the local map may be merged with the global map using the map merging engine 257 and/or the global mapping engine 255 after the local map has already been optimized using the map optimization engine 235, so that the global map is an optimized map. The map points 240 may be fed into the local map by the local mapping engine 250, and/or can be fed into the global map using the global mapping engine 255. The map optimization engine 235 may improve the accuracy of the map points 240 and of the local map and/or global map. The map optimization engine 235 may, in some cases, simplify the local map and/or the global map by replacing a bundle of map points with a centroid map point as illustrated in and discussed with respect to the conceptual diagram 1100 of FIG. 11.

The VSLAM system 270 may also determine a pose 245 of the device 205 based on the feature extraction and/or the feature tracking performed by the feature extraction engine 220 and/or the feature tracking engine 225. The pose 245 of the device 205 may refer to the location of the device 205, the pitch of the device 205, the roll of the device 205, the yaw of the device 205, or some combination thereof. The pose 245 of the device 205 may refer to the pose of the camera 210, and may thus include the location of the camera 210, the pitch of the camera 210, the roll of the camera 210, the yaw of the camera 210, or some combination thereof. The pose 245 of the device 205 may be determined with respect to the local map and/or the global map. The pose 245 of the device 205 may be marked on local map by the local mapping engine 250 and/or on the global map by the global mapping engine 255. In some cases, a history of poses 245 may be stored within the local map and/or the global map by the local mapping engine 250 and/or by the global mapping engine 255. The history of poses 245, together, may indicate a path that the VSLAM device 205 has traveled.

In some cases, the feature tracking engine 225 can fail to successfully perform feature tracking for an image 215 when no features that have been previously recognized in a set of earlier-captured images are recognized in the image 215. In some examples, the set of earlier-captured images may include all images captured during a time period ending before capture of the image 215 and starting at a predetermined start time. The predetermined start time may be an absolute time, such as a particular time and date. The predetermined start time may be a relative time, such as a predetermined amount of time (e.g., 30 minutes) before capture of the image 215. The predetermined start time may be a time at which the VSLAM device 205 was most recently initialized. The predetermined start time may be a time at which the VSLAM device 205 most recently received an instruction to begin a VSLAM procedure. The predetermined start time may be a time at which the VSLAM device 205 most recently determined that it entered a new room, or a new region of an environment.

If the feature tracking engine 225 fails to successfully perform feature tracking on an image, the VSLAM system 270 can perform relocalization using a relocalization engine 230. The relocalization engine 230 attempts to determine where in the environment the VSLAM device 205 is located. For instance, the feature tracking engine 225 can fail to recognize any features from one or more previously-captured image and/or from the local map 250. The relocalization engine 230 can attempt to see if any features recognized by the feature extraction engine 220 match any features in the global map. If one or more features that the VSLAM system 270 identified by the feature extraction engine 220 match one or more features in the global map 255, the relocalization engine 230 successfully performs relocalization by determining the map points 240 for the one or more features and/or determining the pose 245 of the VSLAM device 205. The relocalization engine 230 may also compare any features identified in the image 215 by the feature extraction engine 220 to features in keyframes stored alongside the local map and/or the global map. Each keyframe may be an image that depicts a particular feature clearly, so that the image 230 can be compared to the keyframe to determine whether the image 230 also depicts that particular feature. If none of the features that the VSLAM system 270 identifies during feature extraction 220 match any of the features in the global map and/or in any keyframe, the relocalization engine 230 fails to successfully perform relocalization. If the relocalization engine 230 fails to successfully perform relocalization, the VSLAM system 270 may exit and reinitialize the VSLAM process. Exiting and reinitializing may include generating the local map 250 and/or the global map 255 from scratch.

The VSLAM device 205 may include a conveyance through which the VSLAM device 205 may move itself about the environment. For instance, the VSLAM device 205 may include one or more motors, one or more actuators, one or more wheels, one or more propellers, one or more turbines, one or more rotors, one or more wings, one or more airfoils, one or more gliders, one or more treads, one or more legs, one or more feet, one or more pistons, one or more nozzles, one or more thrusters, one or more sails, one or more other modes of conveyance discussed herein, or combinations thereof. In some examples, the VSLAM device 205 may be a vehicle, a robot, or any other type of device discussed herein. A VSLAM device 205 that includes a conveyance may perform path planning using a path planning engine 260 to plan a path for the VSLAM device 205 to move. Once the path planning engine 260 plans a path for the VSLAM device 205, the VSLAM device 205 may perform movement actuation using a movement actuator 265 to actuate the conveyance and move the VSLAM device 205 along the path planned by the path planning engine 260. In some examples, path planning engine 260 may use a Dijkstra algorithm to plan the path. In some examples, the path planning engine 260 may include stationary obstacle avoidance and/or moving obstacle avoidance in planning the path. In some examples, the path planning engine 260 may include determinations as to how to best move from a first pose to a second pose in planning the path. In some examples, the path planning engine 260 may plan a path that is optimized to reach and observe every portion of every room before moving on to other rooms in planning the path. In some examples, the path planning engine 260 may plan a path that is optimized to reach and observe every room in an environment as quickly as possible. In some examples, the path planning engine 260 may plan a path that returns to a previously-observed room to observe a particular feature again to improve one or more map points corresponding the feature in the local map and/or global map. In some examples, the path planning engine 260 may plan a path that returns to a previously-observed room to observe a portion of the previously-observed room that lacks map points in the local map and/or global map to see if any features can be observed in that portion of the room.

While the various elements of the conceptual diagram 200 are illustrated separately from the VSLAM device 205, it should be understood that the VSLAM device 205 may include any combination of the elements of the conceptual diagram 200. For instance, at least a subset of the VSLAM system 270 may be part of the VSLAM device 205. At least a subset of the mapping system 275 may be part of the VSLAM device 205. For instance, the VSLAM device 205 may include the camera 210, feature extraction engine 220, the feature tracking engine 225, the relocation engine 230, the map optimization engine 235, the local mapping engine 250, the global mapping engine 255, the map merging engine 257, the path planning engine 260, the movement actuator 255, or some combination thereof. In some examples, the VSLAM device 205 can capture the image 215, identify features in the image 215 through the feature extraction engine 220, track the features through the feature tracking engine 225, optimize the map using the map optimization engine 235, perform relocalization using the relocalization engine 230, determine map points 240, determine a device pose 245, generate a local map using the local mapping engine 250, update the local map using the local mapping engine 250, perform map merging using the map merging engine 257, generate the global map using the global mapping engine 255, update the global map using the global mapping engine 255, plan a path using the path planning engine 260, actuate movement using the movement actuator 265, or some combination thereof. In some examples, the feature extraction engine 220 and/or the feature tracking engine 225 are part of a front-end of the VSLAM device 205. In some examples, the relocalization engine 230 and/or the map optimization engine 235 are part of a back-end of the VSLAM device 205. Based on the image 215 and/or previous images, the VSLAM device 205 may identify features through feature extraction 220, track the features through feature tracking 225, perform map optimization 235, perform relocalization 230, determine map points 240, determine pose 245, generate a local map 250, update the local map 250, perform map merging, generate the global map 255, update the global map 255, perform path planning 260, or some combination thereof.

In some examples, the map points 240, the device poses 245, the local map, the global map, the path planned by the path planning engine 260, or combinations thereof are stored at the VSLAM device 205. In some examples, the map points 240, the device poses 245, the local map, the global map, the path planned by the path planning engine 260, or combinations thereof are stored remotely from the VSLAM device 205 (e.g., on a remote server), but are accessible by the VSLAM device 205 through a network connection. The mapping system 275 may be part of the VSLAM device 205 and/or the VSLAM system 270. The mapping system 275 may be part of a device (e.g., a remote server) that is remote from the VSLAM device 205 but in communication with the VSLAM device 205.

In some cases, the VSLAM device 205 may be in communication with a remote server. The remote server can include at least a subset of the VSLAM system 270. The remote server can include at least a subset of the mapping system 275. For instance, the VSLAM device 205 may include the camera 210, feature extraction engine 220, the feature tracking engine 225, the relocation engine 230, the map optimization engine 235, the local mapping engine 250, the global mapping engine 255, the map merging engine 257, the path planning engine 260, the movement actuator 255, or some combination thereof. In some examples, the VSLAM device 205 can capture the image 215 and send the image 215 to the remote server. Based on the image 215 and/or previous images, the remote server may identify features through the feature extraction engine 220, track the features through the feature tracking engine 225, optimize the map using the map optimization engine 235, perform relocalization using the relocalization engine 230, determine map points 240, determine a device pose 245, generate a local map using the local mapping engine 250, update the local map using the local mapping engine 250, perform map merging using the map merging engine 257, generate the global map using the global mapping engine 255, update the global map using the global mapping engine 255, plan a path using the path planning engine 260, or some combination thereof. The remote server can send the results of these processes back to the VSLAM device 205.

Figure 3:
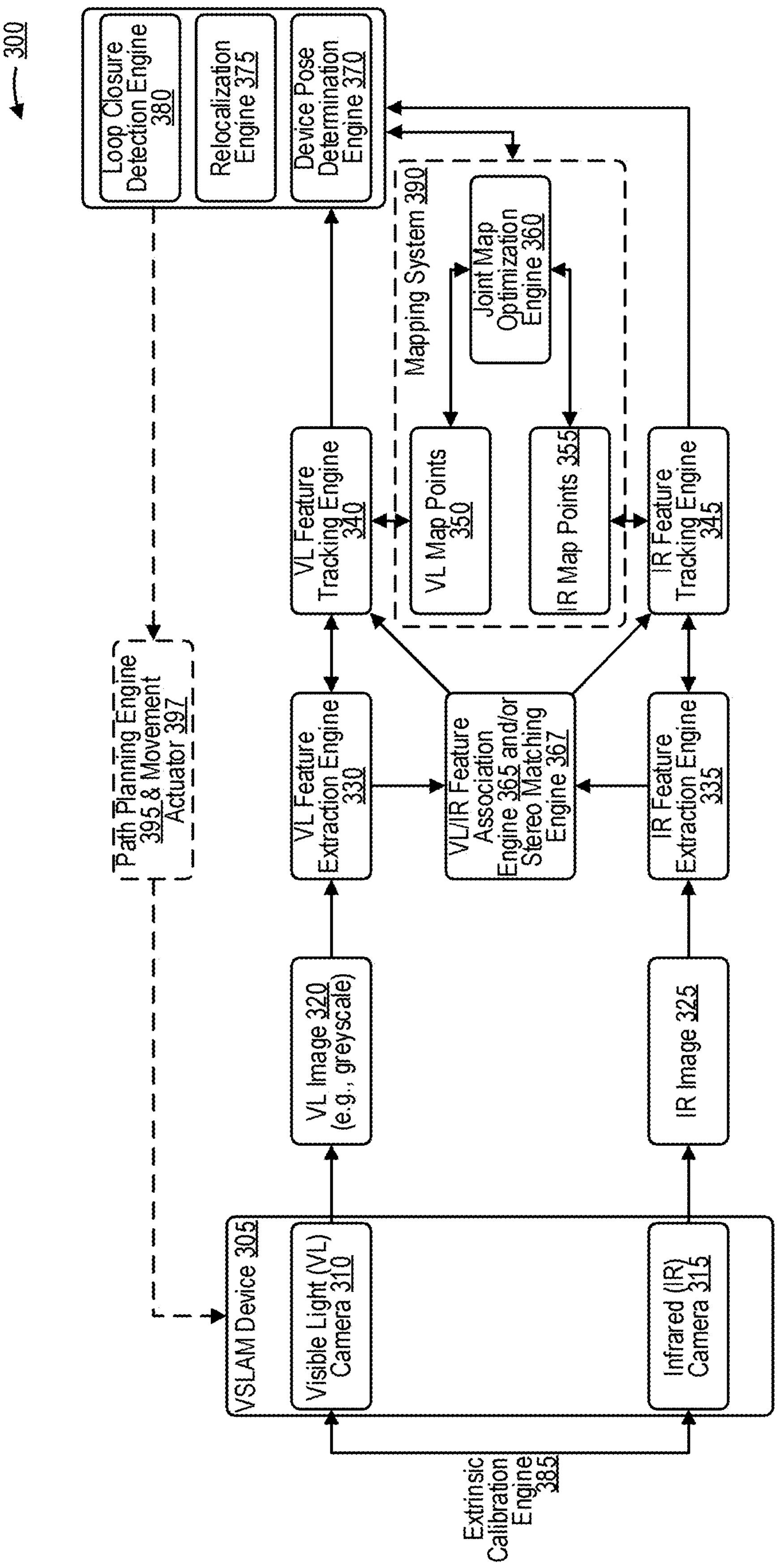
FIG. 3 is a conceptual diagram illustrating an example of a technique for performing VSLAM using a visible light (VL) camera and an infrared (IR) camera of a VSLAM device, in accordance with some examples.

FIG. 3 is a conceptual diagram 300 illustrating an example of a technique for performing visual simultaneous localization and mapping (VSLAM) using a visible light (VL) camera 310 and an infrared (IR) camera 315 of a VSLAM device 305. The VSLAM device 305 of FIG. 3 may be any type of VSLAM device, including any of the types of VSLAM device discussed with respect to the VSLAM device 205 of FIG. 2. The VSLAM device 305 includes the VL camera 310 and the IR camera 315. In some cases, the IR camera 315 may be a near-infrared (NIR) camera. The IR camera 315 may capture the IR image 325 by receiving and capturing light in the NIR spectrum. The NIR spectrum may be a subset of the IR spectrum that is near and/or adjacent to the VL spectrum.

The VSLAM device 305 may use the VL camera 310 and/or an ambient light sensor to determine whether an environment in which the VSLAM device 305 is well-illuminated or poorly-illuminated. For example, if an average luminance in a VL image 320 captured by the VL camera 310 exceeds a predetermined luminance threshold, the VSLAM device 305 may determine that the environment is well-illuminated. If an average luminance in the VL image 320 captured by the VL camera 310 falls below the predetermined luminance threshold, the VSLAM device 305 may determine that the environment is poorly-illuminated. If the VSLAM device 305 determines that the environment is well-illuminated, the VSLAM device 305 may use both the VL camera 310 and the IR camera 315 for a VSLAM process as illustrated in the conceptual diagram 300 of FIG.

3. If the VSLAM device 305 determines that the environment is poorly-illuminated, the VSLAM device 305 may disable use of the VL camera 310 for the VSLAM process and may use only the IR camera 315 for the VSLAM process as illustrated in the conceptual diagram 400 of FIG. 4.

The VSLAM device 305 may move throughout an environment, reaching multiple positions along a path through the environment. A path planning engine 395 may plan at least a subset of the path as discussed herein. The VSLAM device 305 may move itself along the path by actuating a motor or other conveyance using a movement actuator 397. For instance, the VSLAM device 305 may move itself along the path if the VSLAM device 305 is a robot or a vehicle. The VSLAM device 305 or may be moved by a user along the path. For instance, the VSLAM device 305 may be moved by a user along the path if the VSLAM device 305 is a head-mounted display (HMD) (e.g., XR headset) worn by the user. In some cases, the environment may be a virtual environment or a partially virtual environment that is at least partially rendered by the VSLAM device 305. For instance, if the VSLAM device 305 is an AR, VR, or XR headset, at least a portion of the environment may be virtual.

At each position of a number of positions along a path through the environment, the VL camera 310 of the VSLAM device 305 captures the VL image 320 of the environment and the IR camera 315 of the VSLAM device 305 captures one or more IR images of the environment. In some cases, the VL image 320 and the IR image 325 are captured simultaneously. In some examples, the VL image 320 and the IR image 325 are captured within the same window of time. The window of time may be short, such as 1 second, 2, seconds 3 seconds, less than 1 second, more than 3 seconds or a duration of time between any of the previously listed durations of time. In some examples, the time between capture of the VL image 320 and capture of the IR image 325 falls below a predetermined threshold time. The short predetermined threshold time may be a short duration of time, such as 1 second, 2, seconds 3 seconds, less than 1 second, more than 3 seconds or a duration of time between any of the previously listed durations of time.

Figure 8:
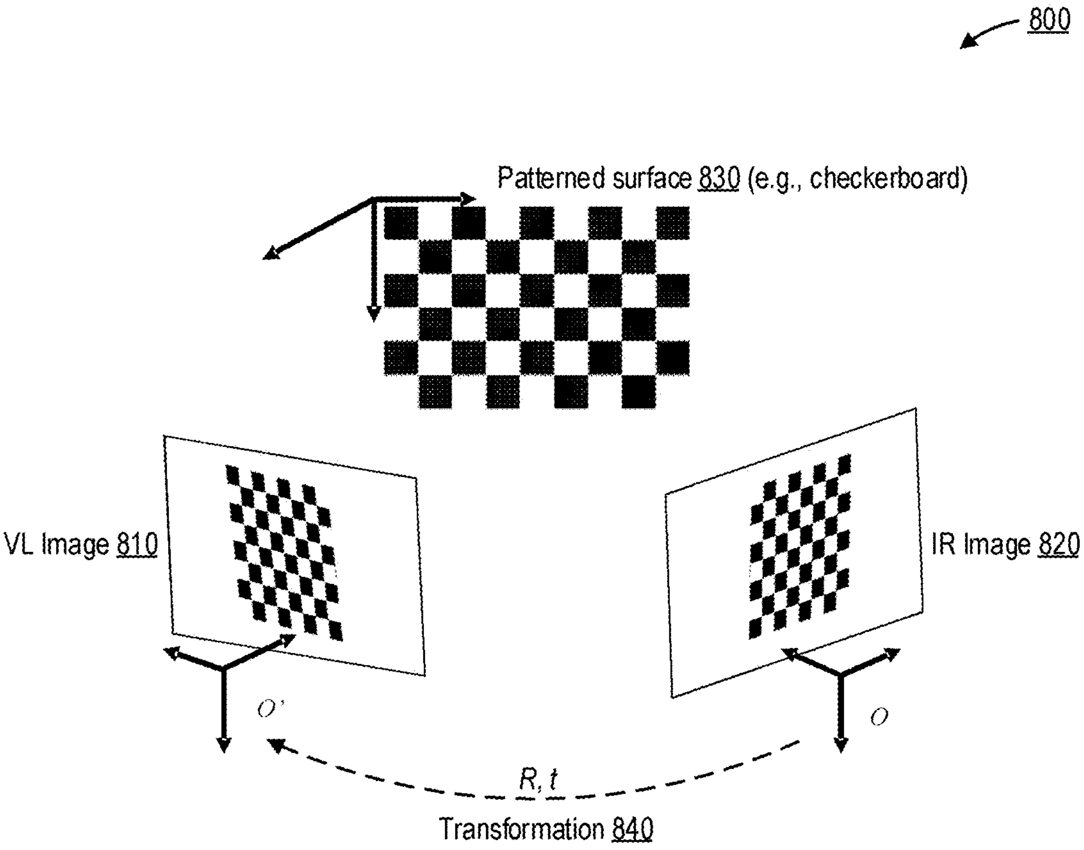
FIG. 8 is a conceptual diagram illustrating extrinsic calibration of a VL camera and an IR camera, in accordance with some examples.

An extrinsic calibration engine 385 of the VSLAM device 305 may perform extrinsic calibration 385 of the VL camera 310 and the IR camera 315 before the VSLAM device 305 is used to perform a VSLAM process. The extrinsic calibration engine 385 can determine a transformation through which coordinates in an IR image 325 captured by the IR camera 315 can be translated into coordinates in a VL image 320 captured by the VL camera 310, and/or vice versa. In some examples, the transformation is a direct linear transformation (DLT). In some examples, the transformation is a stereo matching transformation. The extrinsic calibration engine 385 can determine a transformation with which coordinates in a VL image 320 and/or in an IR image 325 can be translated into three-dimensional map points. The conceptual diagram 800 of FIG. 8 illustrates an example of extrinsic calibration as performed by the extrinsic calibration engine 385. The transformation 840 may be an example of the transformation determined by the extrinsic calibration engine 385.

The VL camera 310 of the VSLAM device 305 captures a VL image 320. In some examples, the VL camera 310 of the VSLAM device 305 may capture the VL image 320 in greyscale. In some examples, the VL camera 310 of the VSLAM device 305 may capture the VL image 320 in color, and may convert the VL image 320 from color to greyscale at an ISP 154, host processor 152, or image processor 150. The IR camera 315 of the VSLAM device 305 captures an IR image 325. In some cases, the IR image 325 may be a greyscale image. For example, a greyscale IR image 325 may represent objects emitting or reflecting a lot of IR light as white or light grey, and may represent objects emitting or reflecting little IR light represented as black or dark grey, or vice versa. In some cases, the IR image 325 may be a color image. For example, a color IR image 325 may represent objects emitting or reflecting a lot of IR light represented in a color close to one end of the visible color spectrum (e.g., red), and may represent objects emitting or reflecting little IR light represented in a color close to the other end of the visible color spectrum (e.g., blue or purple), or vice versa. In some examples, the IR camera 315 of the VSLAM device 305 may convert the IR image 325 from color to greyscale at an ISP 154, host processor 152, or image processor 150. In some cases, the VSLAM device 305 sends the VL image 320 and/or the IR image 325 to another device, such as a remote server, after the VL image 320 and/or the IR image 325 are captured.

A VL feature extraction engine 330 may perform feature extraction on the VL image 320. The VL feature extraction engine 330 may be part of the VSLAM device 305 and/or the remote server. The VL feature extraction engine 330 may identify one or more features as being depicted in the VL image 320. Identification of features using VL feature extraction engine 330 may include determining two-dimensional (2D) coordinates of the feature as depicted in the VL image 320. The 2D coordinates may include a row and column in the pixel array of the VL image 320. A VL image 320 with many features depicted clearly may be maintained in a map database as a VL keyframe, whose depictions of the features may be used for tracking those features in other VL images and/or IR images.

An IR feature extraction engine 335 may perform feature extraction on the IR image 325. The IR feature extraction engine 335 may be part of the VSLAM device 305 and/or the remote server. The IR feature extraction engine 335 may identify one or more features as being depicted in the IR image 325. Identification of features using IR feature extraction engine 335 may include determining two-dimensional (2D) coordinates of the feature as depicted in the IR image 325. The 2D coordinates may include a row and column in the pixel array of the IR image 325. An IR image 325 with many features depicted clearly may be maintained in a map database as an IR keyframe, whose depictions of the features may be used for tracking those features in other IR images and/or VL images. Features may include, for example, corners or other distinctive features of objects in the environment. The VL feature extraction engine 330 and the IR feature extraction engine 335 may further perform any procedures discussed with respect to the feature extraction engine 220 of the conceptual diagram 200.

Either or both of the VL/IR feature association engine 365 and/or the stereo matching engine 367 may be part of the VSLAM device 305 and/or the remote server. The VL feature extraction engine 330 and the IR feature extraction engine 335 may identify one or more features that are depicted in both the VL image 320 and the IR image 325. The VL/IR feature association engine 365 identifies these features that are depicted in both the VL image 320 and the IR image 325, for instance based on transformations determined using extrinsic calibration performed by the extrinsic calibration engine 385. The transformations may transform 2D coordinates in the IR image 325 into 2D coordinates in the VL image 320, and/or vice versa. The stereo matching engine 367 may further determine a three-dimensional (3D) set of map coordinates—a map point—based on the 2D coordinates in the IR image 325 and the 2D coordinates in the VL image 320, which are captured from slightly different angles. A stereo-constraint can be determined by the stereo matching engine 367 between the framing of the VL camera 310 and the IR camera 315 to speed up the feature search and match performance for feature tracking and/or relocalization.

The VL feature tracking engine 340 may be part of the VSLAM device 305 and/or the remote server. The VL feature tracking engine 340 tracks features identified in the VL image 320 using the VL feature extraction engine 330 that were also depicted and detected in previously-captured VL images that the VL camera 310 captured before capturing the VL image 320. In some cases, the VL feature tracking engine 330 may also track features identified in the VL image 320 that were also depicted and detected in previously-captured IR images that the IR camera 315 captured before capture of the VL image 320. The IR feature tracking engine 345 may be part of the VSLAM device 305 and/or the remote server. The IR feature tracking engine 345 tracks features identified in the IR image 325 using the IR feature extraction engine 335 that were also depicted and detected in previously-captured IR images that the IR camera 315 captured before capturing the IR image 325. In some cases, the IR feature tracking engine 335 may also track features identified in the IR image 325 that were also depicted and detected in previously-captured IR images that the IR camera 315 captured before capture of the VL image 320. Features determined to be depicted in both the VL image 320 and the IR image 325 using the VL/IR feature association engine 365 and/or the stereo matching engine 367 may be tracked using the VL feature tracking engine 340, the IR feature tracking engine 345, or both. The VL feature tracking engine 340 and the IR feature tracking engine 345 may further perform any procedures discussed with respect to the feature tracking engine 225 of the conceptual diagram 200.

Each of the VL map points 350 is a set of coordinates in a map that are determined using the mapping system 390 based on features extracted using the VL feature extraction engine 330, features tracked using the VL feature tracking engine 340, and/or features in common identified using the VL/IR feature association engine 365 and/or the stereo matching engine 367. Each of the IR map points 355 is a set of coordinates in the map that are determined using the mapping system 390 based on features extracted using the IR feature extraction engine 335, features tracked using the IR feature tracking engine 345, and/or features in common identified using the VL/IR feature association engine 365 and/or the stereo matching engine 367. The VL map points 350 and the IR map points 355 can be three-dimensional (3D) map points, for example having three spatial dimensions. In some examples, each of the VL map points 350 and/or the IR map points 355 may have an X coordinate, a Y coordinate, and a Z coordinate. Each coordinate may represent a position along a different axis. Each axis may extend into a different spatial dimension perpendicular to the other two spatial dimensions. Determination of the VL map points 350 and the IR map points 355 using the mapping engine 390 may further include any procedures discussed with respect to the determination of the map points 240 of the conceptual diagram 200. The mapping engine 390 may be part of the VSLAM device 305 and/or part of the remote server.

The joint map optimization engine 360 adds the VL map points 350 and the IR map points 355 to the map and/or optimizes the map. The joint map optimization engine 360 may merge VL map points 350 and IR map points 355 corresponding to features determined to be depicted in both the VL image 320 and the IR image 325 (e.g., using the VL/IR feature association engine 365 and/or the stereo matching engine 367) into a single map point. The joint map optimization engine 360 may also merge a VL map point 350 corresponding to a feature determined to be depicted in previous IR map point from one or more previous IR images and/or a previous VL map point from one or more previous VL images into a single map point. The joint map optimization engine 360 may also merge an IR map point 355 corresponding to a feature determined to be depicted in a previous VL map point from one or more previous VL images and/or a previous IR map point from one or more previous IR images into a single map point. As more VL images 320 and IR images 325 are captured depicting a certain feature, the joint map optimization engine 360 may update the position of the map point corresponding to that feature in the map to be more accurate (e.g., based on triangulation). For instance, an updated set of coordinates for a map point for a feature may be generated by updating or revising a previous set of coordinates for the map point for the feature. The map may be a local map as discussed with respect to the local mapping engine 250. In some cases, the map is merged with a global map using a map merging engine 257 of the mapping system 290. The map may be a global map as discussed with respect to the global mapping engine 255. The joint map optimization engine 360 may, in some cases, simplify the map by replacing a bundle of map points with a centroid map point as illustrated in and discussed with respect to the conceptual diagram 1100 of FIG. 11. The joint map optimization engine 360 may further perform any procedures discussed with respect to the map optimization engine 235 in the conceptual diagram 200.

The mapping system 290 can generate the map of the environment based on the sets of coordinates that the VSLAM device 305 determines for all map points for all detected and/or tracked features, including the VL map points 350 and the IR map points 355. In some cases, when the mapping system 390 first generates the map, the map can start as a map of a small portion of the environment. The mapping system 390 may expand the map to map a larger and larger portion of the environment as more features are detected from more images, and as more of the features are converted into map points that the mapping system updates the map to include. The map can be sparse or semi-dense. In some cases, selection criteria used by the mapping system 390 for map points corresponding to features can be harsh to support robust tracking of features using the VL feature tracking engine 340 and/or the IR feature tracking engine 345.

A device pose determination engine 370 may determine a pose of the VSLAM device 305. The device pose determination engine 370 may be part of the VSLAM device 305 and/or the remote server. The pose of the VSLAM device 305 may be determined based on the feature extraction by the VL feature extraction engine 330, the feature extraction by the IR feature extraction engine 335, the feature association by the VL/IR feature association engine 365, the stereo matching by the stereo matching engine 367, the feature tracking by the VL feature tracking engine 340, the feature tracking by the IR feature tracking engine 345, the determination of VL map points 350 by the mapping system 390, the determination of IR map points 355 by the mapping system 390, the map optimization by the joint map optimization engine 360, the generation of the map by the mapping system 390, the updates to the map by the mapping system 390, or some combination thereof. The pose of the device 305 may refer to the location of the VSLAM device 305, the pitch of the VSLAM device 305, the roll of the VSLAM device 305, the yaw of the VSLAM device 305, or some combination thereof. The pose of the VSLAM device 305 may refer to the pose of the VL camera 310, and may thus include the location of the VL camera 310, the pitch of the VL camera 310, the roll of the VL camera 310, the yaw of the VL camera 310, or some combination thereof. The pose of the VSLAM device 305 may refer to the pose of the IR camera 315, and may thus include the location of the IR camera 315, the pitch of the IR camera 315, the roll of the IR camera 315, the yaw of the IR camera 315, or some combination thereof. The device pose determination engine 370 may determine the pose of the VSLAM device 305 with respect to the map, in some cases using the mapping system 390. The device pose determination engine 370 may mark the pose of the VSLAM device 305 on the map, in some cases using the mapping system 390. In some cases, the device pose determination engine 370 may determine and store a history of poses within the map or otherwise. The history of poses may represent a path of the VSLAM device 305. The device pose determination engine 370 may further perform any procedures discussed with respect to the determination of the pose 245 of the VSLAM device 205 of the conceptual diagram 200. In some cases, the device pose determination engine 370 may determining the pose of the VSLAM device 305 by determining a pose of a body of the VSLAM device 305, determining a pose of the VL camera 310, determining a pose of the IR camera 315, or some combination thereof. One or more of those three poses may be separate outputs of the device pose determination engine 370. The device pose determination engine 370 may in some cases merge or combine two or more of those three poses into a single output of the device pose determination engine 370, for example by averaging pose values corresponding to two or more of those three poses.

The relocalization engine 375 may determine the location of the VSLAM device 305 within the map. For instance, the relocalization engine 375 may relocate the VSLAM device 305 within the map if the VL feature tracking engine 340 and/or the IR feature tracking engine 345 fail to recognize any features in the VL image 320 and/or in the IR image 325 from features identified in previous VL and/or IR images. The relocalization engine 375 can determine the location of the VSLAM device 305 within the map by matching features identified in the VL image 320 and/or in the IR image 325 via the VL feature extraction engine 330 and/or the IR feature extraction engine 335 with features corresponding to map points in the map, with features depicted in VL keyframes, with features depicted in IR keyframes, or some combination thereof. The relocalization engine 375 may be part of the VSLAM device 305 and/or the remote server. The relocalization engine 375 may further perform any procedures discussed with respect to the relocalization engine 230 of the conceptual diagram 200.

The loop closure detection engine 380 may be part of the VSLAM device 305 and/or the remote server. The loop closure detection engine 380 may identify when the VSLAM device 305 has completed travel along a path shaped like a closed loop or another closed shape without any gaps or openings. For instance, the loop closure detection engine 380 can identify that at least some of the features depicted in and detected in the VL image 320 and/or in the IR image 325 match features recognized earlier during travel along a path on which the VSLAM device 305 is traveling. The loop closure detection engine 380 may detect loop closure based on the map as generated and updated by the mapping system 390 and based on the pose determined by the device pose determination engine 370. Loop closure detection by the loop closure detection engine 380 prevents the VL feature tracking engine 340 and/or the IR feature tracking engine 345 from incorrectly treating certain features depicted in and detected in the VL image 320 and/or in the IR image 325 as new features, when those features match features previously detected in the same location and/or area earlier during travel along the path along which the VSLAM device 305 has been traveling.

The VSLAM device 305 may include any type of conveyance discussed with respect to the VSLAM device 205. A path planning engine 395 can plan a path that the VSLAM device 305 is to travel along using the conveyance. The path planning engine 395 can plan the path based on the map, based on the pose of the VSLAM device 305, based on relocalization by the relocalization engine 375, and/or based on loop closure detection by the loop closure detection engine 380. The path planning engine 395 can be part of the VSLAM device 305 and/or the remote server. The path planning engine 395 may further perform any procedures discussed with respect to the path planning engine 260 of the conceptual diagram 200. The movement actuator 397 can be part of the VSLAM device 305 and can be activated by the VSLAM device 305 or by the remote server to actuate the conveyance to move the VSLAM device 305 along the path planned by the path planning engine 395. For example, the movement actuator 397 may include one or more actuators that actuate one or more motors of the VSLAM device 305. The movement actuator 397 may further perform any procedures discussed with respect to the movement actuator 265 of the conceptual diagram 200.

The VSLAM device 305 can use the map to perform various functions with respect to positions depicted or defined in the map. For instance, using a robot as an example of a VSLAM device 305 utilizing the techniques described herein, the robot can actuate a motor via movement actuator 397 to move the robot from a first position to a second position. The second position can be determined using the map of the environment, for instance to ensure that the robot avoids running into walls or other obstacles whose positions are already identified in the map or to avoid unintentionally revisiting positions that the robot has already visited. A VSLAM device 305 can, in some cases, plan to revisit positions that the VSLAM device 305 has already visited. For instance, the VSLAM device 305 may revisit previous positions to verify prior measurements, to correct for drift in measurements after a closing a looped path or otherwise reaching the end of a long path, to improve accuracy of map points that seem inaccurate (e.g., outliers) or have low weights or confidence values, to detect more features in an area that includes few and/or sparse map points, or some combination thereof. The VSLAM device 305 can actuate the motor to move itself from the initial position to a target position to achieve an objective, such as food delivery, package delivery, package retrieval, capturing image data, mapping the environment, finding and/or reaching a charging station or power outlet, finding and/or reaching a base station, finding and/or reaching an exit from the environment, finding and/or reaching an entrance to the environment or another environment, or some combination thereof.

Once the VSLAM device 305 is successfully initialized, VSLAM device 305 may repeat many of the processes illustrated in the conceptual diagram 300 at each new position of the VSLAM device 305. For instance, the VSLAM device 305 may iteratively initiate the VL feature extraction engine 330, the IR feature extraction engine 335, the VL/IR feature association engine 365, the stereo matching engine 367, the VL feature tracking engine 340, the IR feature tracking engine 345, the mapping system 390, the joint map optimization system 360, the devise pose determination engine 370 the relocalization engine 375, the loop closure detection engine 380, the path planning engine 395, the movement actuator 397, or some combination thereof at each new position of the VSLAM device 305. The features detected in each VL image 320 and/or each IR image 325 at each new position of the VSLAM device 305 can include features that are also observed in previously-captured VL and/or IR images. The VSLAM device 305 can track movement of these features from the previously-captured images to the most recent images to determine the pose of the VSLAM device 305. The VSLAM device 305 can update the 3D map point coordinates corresponding to each of the features.

The mapping system 390 may assign each map point in the map with a particular weight. Different map points in the map may have different weights associated with them. The map points generated from VL/IR feature association 365 and stereo matching 367 may generally have good accuracy due to the reliability of the transformations calibrated using the extrinsic calibration engine 385, and therefore can have higher weights than map points that were seen with only the VL camera 310 or only the IR camera 315. Features depicted in a higher number of VL and/or IR images generally have improved accuracy compared to features depicted in a lower number of VL and/or IR images. Thus, map points for features depicted in a higher number of VL and/or IR images may have greater weights in the map compared to map points depicted in a lower number of VL and/or IR images. The joint map optimization engine 360 may include global optimization and/or local optimization algorithms, which can correct the positioning of lower-weight map points based on the positioning of higher-weight map points, improving the overall accuracy of the map. For instance, if an long edge of a wall includes a number of high-weight map points that form a substantially straight line and a low-weight map point that slightly breaks the linearity of the line, the position of the low-weight map point may be adjusted to be brought into (or closer to) the line so as to no longer break the linearity of the line (or to break the linearity of the line to a lesser extent). The joint map optimization engine 360 can, in some cases, remove or move certain map points with low weights, for instance if future observations appear to indicate that those map points are erroneously positioned. The features identified in a VL image 320 and/or an IR image 325 captured when the VSLAM device 305 reaches a new position can also include new features not previously identified in any previously-captured VL and/or IR images. The mapping system 390 can update the map to integrate these new features, effectively expanding the map.

In some cases, the VSLAM device 305 may be in communication with a remote server. The remote server can perform some of the processes discussed above as being performed by the VSLAM device 305. For example, the VSLAM device 305 can capture the VL image 320 and/or the IR image 325 of the environment as discussed above and send the VL image 320 and/or IR image 325 to the remote server. The remote server can then identify features depicted in the VL image 320 and IR image 325 through the VL feature extraction engine 330 and the IR feature extraction engine 335. The remote server can include and can run the VL/IR feature association engine 365 and/or the stereo matching engine 367. The remote server can perform feature tracking using the VL feature tracking engine 340, perform feature tracking using the IR feature tracking engine 345, generate VL map points 350, generate IR map points 355, perform map optimization using the joint map optimization engine 360, generate the map using the mapping system 390, update the map using the mapping system 390, determine the device pose of the VSLAM device 305 using the device pose determination engine 370, perform relocalization using the relocalization engine 375, perform loop closure detection using the loop closure detection engine 380, plan a path using the path planning engine 395, send a movement actuation signal to initiate the movement actuator 397 and thus trigger movement of the VSLAM device 305, or some combination thereof. The remote server may sent results of any of these processes back to the VSLAM device 305. By shifting computationally resource-intensive tasks to the remote server, the VSLAM device 305 can be smaller, can include less powerful processor(s), can conserve battery power and therefore last longer between battery charges, perform tasks more quickly and efficiently, and be less resource-intensive.

If the environment is well-illuminated, both the VL image 320 of the environment captured by the VL camera 310 and IR image 325 captured by the IR camera 315 are clear. When an environment is poorly-illuminated, the VL image 320 of the environment captured by the VL camera 310 may be unclear, but IR image 325 captured by the IR camera 315 may still remain clear. Thus, an illumination level of the environment can affect the usefulness of the VL image 320 and the VL camera 310.

Figure 4:
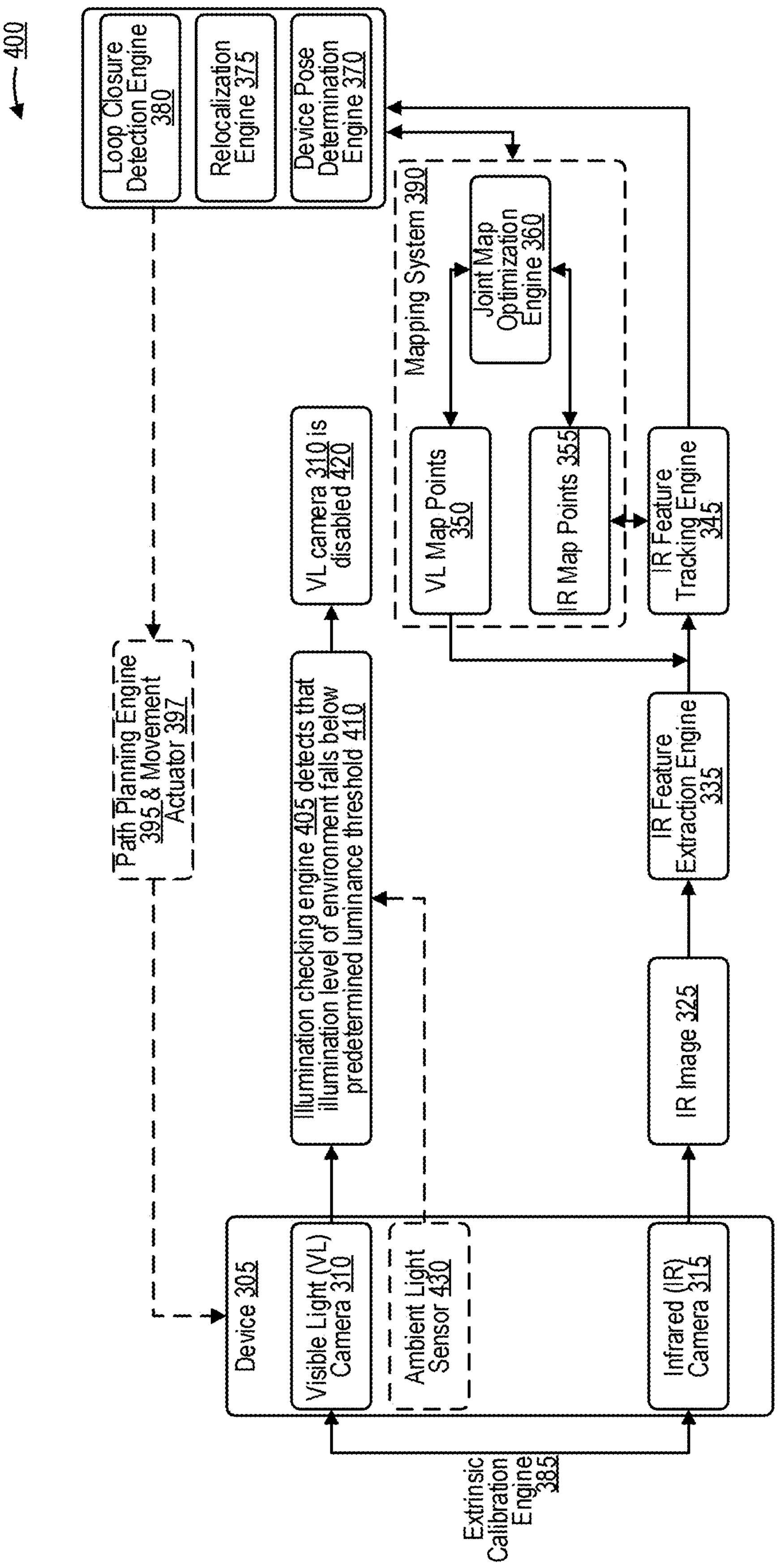
FIG. 4 is a conceptual diagram illustrating an example of a technique for performing VSLAM using an infrared (IR) camera of a VSLAM device, in accordance with some examples.

FIG. 4 is a conceptual diagram 400 illustrating an example of a technique for performing visual simultaneous localization and mapping (VSLAM) using an infrared (IR) camera 315 of a VSLAM device. The VSLAM technique illustrated in the conceptual diagram 400 of FIG. 4 is similar to the VSLAM technique illustrated in the conceptual diagram 300 of FIG. 3. However, in the VSLAM technique illustrated in the conceptual diagram 400 of FIG. 4, the visible light camera 310 may be disabled 420 by an illumination checking engine 405 due to detection by the illumination checking engine 405 that the environment that the VSLAM device 305 is located in is poorly illuminated. In some examples, the visible light camera 310 being disabled 420 means that the visible light camera 310 is turned off and no longer captures VL images. In some examples, the visible light camera 310 being disabled 420 means that the visible light camera 310 still captures VL images, for example for the illumination checking engine 405 to use to check whether illumination conditions have changed in the environment, but those VL images are not otherwise used for VSLAM.

In some examples, the illumination checking engine 405 may use the VL camera 310 and/or an ambient light sensor 430 to determine whether an illumination level of an environment in which the VSLAM device 305 is well-illuminated or poorly-illuminated. The illumination level may be referred to as an illumination condition. To check the illumination level of the environment, the VSLAM device 305 may capture a VL image and/or may make an ambient light sensor measurement using the ambient light sensor 430. If an average luminance in the VL image captured by the VL camera exceeds a predetermined luminance threshold 410, the VSLAM device 305 may determine that the environment is well-illuminated. If an average luminance in the VL image captured by the camera falls below the predetermined luminance threshold 410, the VSLAM device 305 may determine that the environment is poorly-illuminated. Average luminance can refer to mean luminance in the VL image, the median luminance in the VL image, the mode luminance in the VL image, the midrange luminance in the VL image, or some combination thereof. In some cases, determining the average luminance can include downscaling the VL image one or more times, and determining the average luminance of the downscaled image. Similarly, if a luminance of the ambient light sensor measurement exceeds a predetermined luminance threshold 410, the VSLAM device 305 may determine that the environment is well-illuminated. If a luminance of the ambient light sensor measurement falls below the predetermined luminance threshold 410, the VSLAM device 305 may determine that the environment is poorly-illuminated. The predetermined luminance threshold 410 may be referred to as a predetermined illumination threshold, a predetermined illumination level, a predetermined minimum illumination level, a predetermined minimum illumination threshold, a predetermined luminance level, a predetermined minimum luminance level, a predetermined minimum luminance threshold, or some combination thereof.

Different regions of an environment may have different illumination levels (e.g., well-illuminated or poorly-illuminated). The illumination checking engine 405 may check the illumination level of the environment each time the VSLAM device 305 is moved from one pose into another pose of the VSLAM device 305. The illumination level in an environment may also change over time, for instance due to sunrise or sunset, blinds or window coverings changing positions, artificial light sources being turned on or off, a dimmer switch of an artificial light source modifying how much light the artificial light source outputs, an artificial light source being moved or pointed in a different direction, or some combination thereof. The illumination checking engine 405 may check the illumination level of the environment periodically based on certain time intervals. The illumination checking engine 405 may check the illumination level of the environment each time the VSLAM device 305 captures a VL image 320 using the VL camera 310 and/or each time the VSLAM device 305 captures the IR image 325 using the IR camera 315. The illumination checking engine 405 may check the illumination level of the environment periodically every time the VSLAM device 305 captures a certain number of VL image(s) and/or IR image(s) since the last check of the illumination level by the illumination checking engine 405.

The VSLAM technique illustrated in the conceptual diagram 400 of FIG. 4 may include the capture of the IR image 325 by the IR camera 315, feature detection using the IR feature extraction engine 335, feature tracking using the IR feature tracking engine 345, generation of IR map points 355 using the mapping system 390, performance map optimization using the joint map optimization engine 360, generation the map using the mapping system 390, updating of the map using the mapping system 390, determining of the device pose of the VSLAM device 305 using the device pose determination engine 370, relocalization using the relocalization engine 375, loop closure detection using the loop closure detection engine 380, path planning using the path planning engine 395, movement actuation using the movement actuator 397, or some combination thereof. In some cases, the VSLAM technique illustrated in the conceptual diagram 400 of FIG. 4 can be performed after the VSLAM technique illustrated in the conceptual diagram 300 of FIG. 3. For instance, an environment that is well-illuminated at first can become poorly illuminated over time, such as when the sun sets after a time and day turns to night.

By the time the VSLAM technique illustrated in the conceptual diagram 400 of FIG. 4 is initiated, a map may already be generated and/or updated by the mapping system 390 using the VSLAM technique illustrated in the conceptual diagram 300 of FIG. 3. The VSLAM technique illustrated in the conceptual diagram 400 of FIG. 4 can use a map that is already partially or fully generated using the VSLAM technique illustrated in the conceptual diagram 300 of FIG. 3. The mapping system 390 illustrated in the conceptual diagram 400 of FIG. 4 can continue to update and refine the map. Even if the illuminance of the environment changes abruptly, a VSLAM device 305 using the VSLAM techniques illustrated in the conceptual diagrams 300 and 400 of FIG. 3 and FIG. 4 can still work well, reliably, and resiliently. Initial portions of map may be generated using the VSLAM technique illustrated in the conceptual diagram 300 of FIG. 3 can be reused, instead of re-mapping from start, to save computational resources and time.

The VSLAM device 305 can identify a set of 3D coordinates for an IR map point 355 of a new feature depicted in a IR image 325. For instance, the VSLAM device 305 may triangulate the 3D coordinates for the IR map point 355 for the new feature based on the depiction of the new feature in the IR image 325 as well as the depictions of the new feature in other IR images and/or other VL images. The VSLAM device 305 can update an existing set of 3D coordinates for a map point for a previously-identified feature based on a depiction of the feature in the IR image 325.

The IR camera 315 is used in both of the VSLAM techniques illustrated in the conceptual diagrams 300 and 400 of FIG. 3 and FIG. 4, and the transformations determined by the extrinsic calibration engine 385 during extrinsic calibration can be used during both of the VSLAM techniques. Thus, new map points and updates to existing map points in the map determined using the VSLAM technique illustrated in the conceptual diagram 400 of FIG. 4 are accurate and consistent with new map points and updates to existing map points that determined using the VSLAM technique illustrated in the conceptual diagram 300 of FIG. 3.

If the ratio of new features (not previously identified in the map) to existing features (previously identified in the map) is low for an area of the environment, this means that the map is already mostly complete for the area of the environment. If the map is mostly complete for an area of the environment, the VSLAM device 305 can forego updating the map for the area of the environment and instead focus solely on tracking its position, orientation and pose within the map, at least while the VSLAM device 305 is in the area of the environment. As more of the map is updated, the area of the environment can include the whole environment.

In some cases, the VSLAM device 305 may be in communication with a remote server. The remote server can perform any of the processes in the VSLAM technique illustrated in the conceptual diagram 400 of FIG. 4 that are discussed herein as being performed by remote server in the VSLAM technique illustrated in the conceptual diagram 300 of FIG. 3. Furthermore, the remote server can include the illumination checking engine 405 that checks the illumination level of the environment. For instance, the VSLAM device 305 can capture a VL image using the VL camera 310 and/or an ambient light measurement using the ambient light sensor 430. The VSLAM device 305 can send the VL image and/or the ambient light measurement to the remote server. The illumination checking engine 405 of the remote server can determine whether the environment is well-illuminated or poorly-illuminated based on the VL image and/or the ambient light measurement, for example by determining an average luminance of the VL image and comparing the average luminance of the VL image to the predetermined luminance threshold 410 and/or by comparing a luminance of the ambient light measurement to the predetermined luminance threshold 410.

The VSLAM technique illustrated in the conceptual diagram 400 of FIG. 4 may be referred to a "night mode" VSLAM technique, a "nighttime mode" VSLAM technique, a "dark mode" VSLAM technique, a "low-light" VSLAM technique, a "poorly-illuminated environment" VSLAM technique, a "poor illumination" VSLAM technique, a "dim illumination" VSLAM technique, a "poor lighting" VSLAM technique, a "dim lighting" VSLAM technique, an "IR-only" VSLAM technique, an "IR mode" VSLAM technique, or some combination thereof. The VSLAM technique illustrated in the conceptual diagram 300 of FIG. 3 may be referred to a "day mode" VSLAM technique, a "daytime mode" VSLAM technique, a "light mode" VSLAM technique, a "bright mode" VSLAM technique, a "high-light" VSLAM technique, a "well-illuminated environment" VSLAM technique, a "good illumination" VSLAM technique, a "bright illumination" VSLAM technique, a "good lighting" VSLAM technique, a "bright lighting" VSLAM technique, a "VL-IR" VSLAM technique, a "hybrid" VSLAM technique, a "hybrid VL-IR" VSLAM technique, or some combination thereof.

Figure 5:
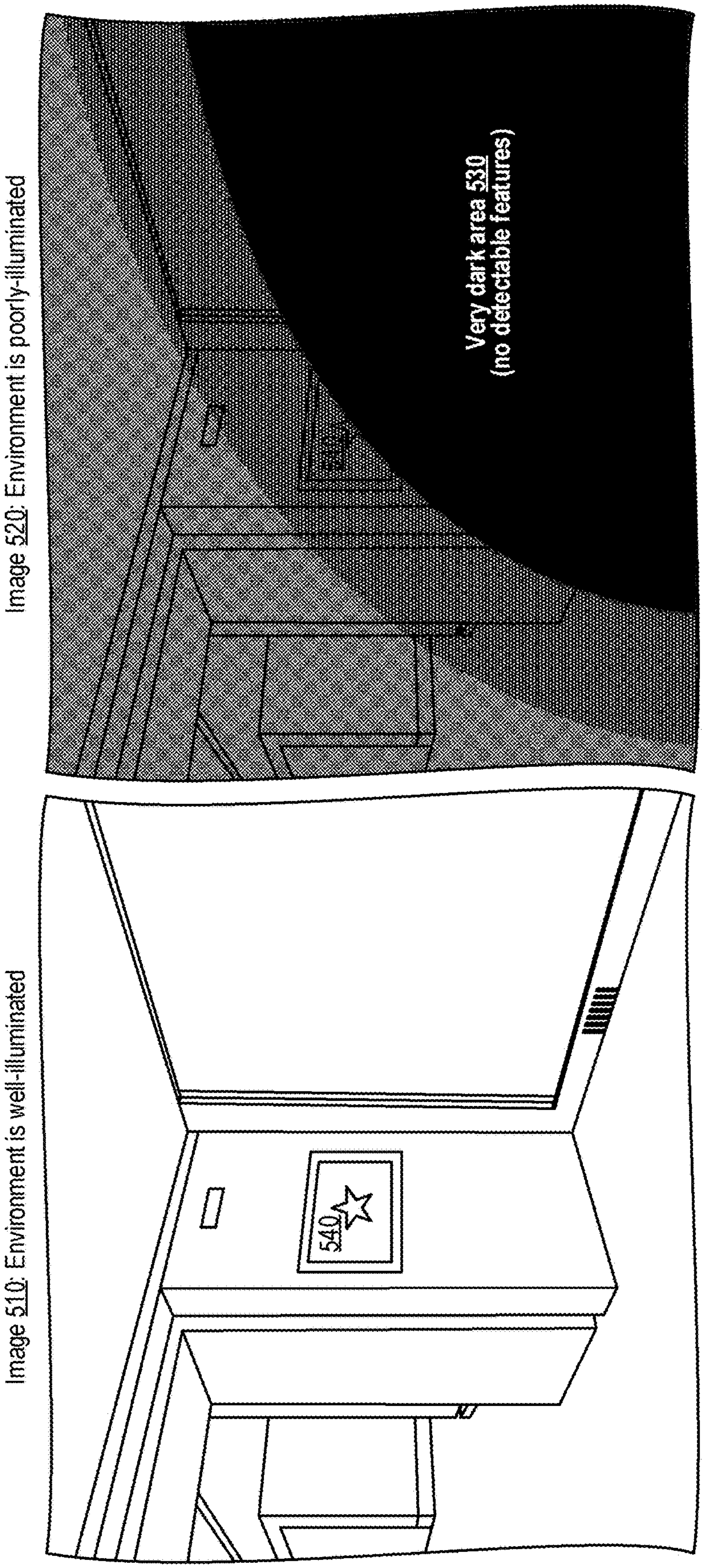
FIG. 5 is a conceptual diagram illustrating two images of the same environment captured under different illumination conditions, in accordance with some examples.

FIG. 5 is a conceptual diagram illustrating two images of the same environment captured under different illumination conditions. In particular, a first image 510 is an example of a VL image of an environment that is captured by the VL camera 310 while the environment is well-illuminated. Various features, such as edges and corners between various walls, and the points on the star 540 in the painting hanging on the wall, are clearly visible and can be extracted by the VL feature extraction engine 330.

On the other hand, the second image 520 is an example of a VL image of an environment that is captured by the VL camera 310 while the environment is poorly-illuminated. Due to the poor illumination of the environment in the second image 520, many of the features that were clearly visible in the first image 510 are either not visible at all in the second image 520 or are not clearly visible in the second image 520. For example, a very dark area 530 in the lower-right corner of the second image 520 is nearly pitch black, so that no features at all are visible in the very dark area 530. This very dark area 530 covers three out of the five points of the star 540 in the painting hanging on the wall, for instance. The remainder of the second image 520 is still somewhat illuminated. However, due to poor illumination of the environment, there is a high risk that many features will not be detected in the second image 520. Due to poor illumination of the environment, there is also high risk that some features that are detected in the second image 520 will not be recognized as matching previously-detected features, even if they do match. For instance, even if VL feature extraction engine 330 detects the two points of the star 540 that are still faintly visible in the second image 520, the VL feature tracking engine 340 may fail to recognize the two points of the star 540 as belonging to the same star 540 detected in one or more other images, such as the first image 510.

The first image 510 may also be an example of an IR image captured by the IR camera 315 of an environment, while the second image 520 is an example of a VL image captured by the VL camera 310 of the same environment. Even in poor illumination, an IR image may be clear.

Figure 6A:
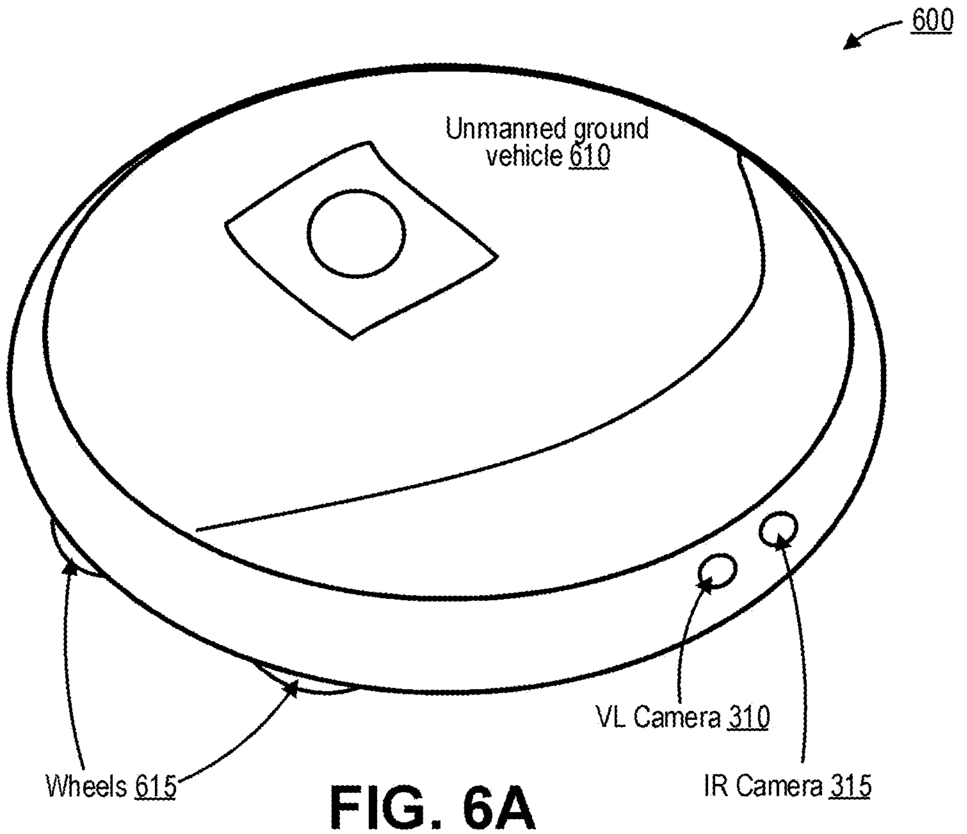
FIG. 6A is a perspective diagram illustrating an unmanned ground vehicle (UGV) that performs VSLAM, in accordance with some examples.

FIG. 6A is a perspective diagram 600 illustrating an unmanned ground vehicle (UGV) 610 that performs visual simultaneous localization and mapping (VSLAM). The UGV 610 illustrated in the perspective diagram 600 of FIG. 6A may be an example of a VSLAM device 205 that performs the VSLAM technique illustrated in the conceptual diagram 200 of FIG. 2, a VSLAM device 305 that performs the VSLAM technique illustrated in the conceptual diagram 300 of FIG. 3, and/or a VSLAM device 305 that performs the VSLAM technique illustrated in the conceptual diagram 400 of FIG. 4. The UGV 610 includes a VL camera 310 adjacent to an IR camera 315 along a front surface of the UGV 610. The UGV 610 includes multiple wheels 615 along a bottom surface of the UGV 610. The wheels 615 may act as a conveyance of the UGV 610, and may be motorized using one or more motors. The motors, and thus the wheels 615, may be actuated to move the UGV 610 via the movement actuator 265 and/or the movement actuator 397.

Figure 6B:
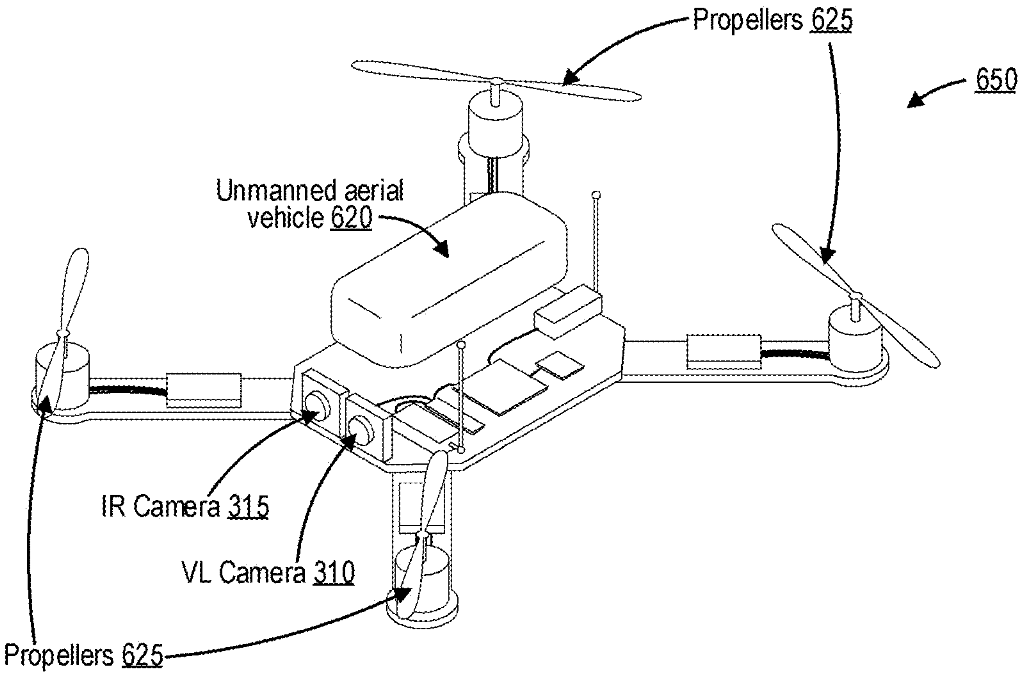
FIG. 6B is a perspective diagram illustrating an unmanned aerial vehicle (UAV) that performs VSLAM, in accordance with some examples.

FIG. 6B is a perspective diagram 650 illustrating an unmanned aerial vehicle (UAV) 620 that performs visual simultaneous localization and mapping (VSLAM). The UAV 620 illustrated in the perspective diagram 650 of FIG. 6B may be an example of a VSLAM device 205 that performs the VSLAM technique illustrated in the conceptual diagram 200 of FIG. 2, a VSLAM device 305 that performs the VSLAM technique illustrated in the conceptual diagram 300 of FIG. 3, and/or a VSLAM device 305 that performs the VSLAM technique illustrated in the conceptual diagram 400 of FIG. 4. The UAV 620 includes a VL camera 310 adjacent to an IR camera 315 along a front portion of a body of the UGV 610. The UAV 620 includes multiple propellers 625 along the top of the UAV 620. The propellers 625 may be spaced apart from the body of the UAV 620 by one or more appendages to prevent the propellers 625 from snagging on circuitry on the body of the UAV 620 and/or to prevent the propellers 625 from occluding the view of the VL camera 310 and/or the IR camera 315. The propellers 625 may act as a conveyance of the UAV 620, and may be motorized using one or more motors. The motors, and thus the propellers 625, may be actuated to move the UAV 620 via the movement actuator 265 and/or the movement actuator 397.

In some cases, the propellers 625 of the UAV 620, or another portion of a VSLAM device 205/305 (e.g., an antenna), may partially occlude the view of the VL camera 310 and/or the IR camera 315. In some examples, this partial occlusion may be edited out of any VL images and/or IR images in which it appears before feature extraction is performed. In some examples, this partial occlusion is not edited out of VL images and/or IR images in which it appears before feature extraction is performed, but the VSLAM algorithm is configured to ignore the partial occlusion for the purposes of feature extraction, and to therefore not treat the any part of the partial occlusion as a feature of the environment.

Figure 7A:
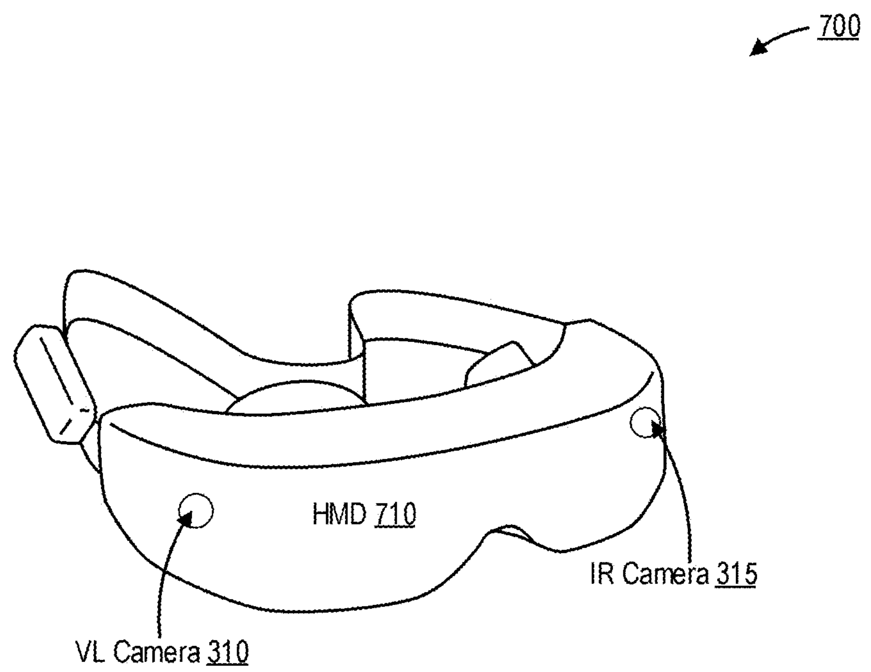
FIG. 7A is a perspective diagram illustrating a head-mounted display (HMD) that performs VSLAM, in accordance with some examples.

FIG. 7A is a perspective diagram 700 illustrating a head-mounted display (HMD) 710 that performs visual simultaneous localization and mapping (VSLAM). The HMD 710 may be an XR headset. The HMD 710 illustrated in the perspective diagram 700 of FIG. 7A may be an example of a VSLAM device 205 that performs the VSLAM technique illustrated in the conceptual diagram 200 of FIG. 2, a VSLAM device 305 that performs the VSLAM technique illustrated in the conceptual diagram 300 of FIG. 3, and/or a VSLAM device 305 that performs the VSLAM technique illustrated in the conceptual diagram 400 of FIG.

4. The HMD 710 includes a VL camera 310 and an IR camera 315 along a front portion of the HMD 710. The HMD 710 may be, for example, an augmented reality (AR) headset, a virtual reality (VR) headset, a mixed reality (MR) headset, or some combination thereof.

Figure 7B:
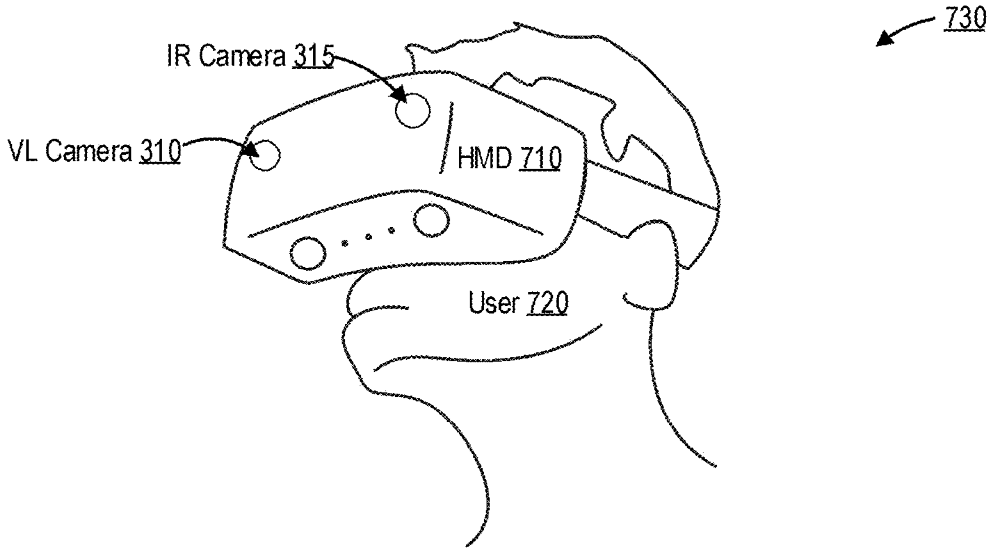
FIG. 7B is a perspective diagram illustrating the head-mounted display (HMD) of FIG. 7A being worn by a user, in accordance with some examples.

FIG. 7B is a perspective diagram 730 illustrating the head-mounted display (HMD) of FIG. 7A being worn by a user 720. The user 720 wears the HMD 710 on the user 720's head over the user 720's eyes. The HMD 710 can capture VL images with the VL camera 310 and/or IR images with the IR camera 315. In some examples, the HMD 710 displays one or more images to the user 720's eyes that are based on the VL images and/or the IR images. For instance, the HMD 710 may provide overlaid information over a view of the environment to the user 720. In some examples, the HMD 710 may generate two images to display to the user 720—one image to display to the user 720's left eye, and one image to display to the user 720's right eye. While the HMD 710 is illustrated having only one VL camera 310 and one IR camera 315, in some cases the HMD 710 (or any other VSLAM device 205/305) may have more than one VL camera 310 and/or more than one IR camera 315. For instance, in some examples, the HMD 710 may include a pair of cameras on either side of the HMD 710, with each pair of cameras including a VL camera 310 and an IR camera 315. Thus, stereoscopic VL and IR views can be captured by the cameras and/or displayed to the user. In some cases, other types of VSLAM devices 205/305 may also include more than one VL camera 310 and/or more than one IR camera 315 for stereoscopic image capture.

The HMD 710 includes no wheels 615, propellers 625, or other conveyance of its own. Instead, the HMD 710 relies on the movements of the user 720 to move the HMD 710 about the environment. Thus, in some cases, the HMD 710, when performing a VSLAM technique, can skip path planning using the path planning engine 260/395 and/or movement actuation using the movement actuator 265/397. In some cases, the HMD 710 can still perform path planning using the path planning engine 260/395, and can indicate directions to follow a suggested path to the user 720 to direct the user along the suggested path planned using the path planning engine 260/395. In some cases, for instance where the HMD 710 is a VR headset, the environment may be entirely or partially virtual. If the environment is at least partially virtual, then movement through the virtual environment may be virtual as well. For instance, movement through the virtual environment can be controlled by one or more joysticks, buttons, video game controllers, mice, keyboards, trackpads, and/or other input devices. The movement actuator 265/397 may include any such input device. Movement through the virtual environment may not require wheels 615, propellers 625, legs, or any other form of conveyance. If the environment is a virtual environment, then the HMD 710 can still perform path planning using the path planning engine 260/395 and/or movement actuation 265/397. If the environment is a virtual environment, the HMD 710 can perform movement actuation using the movement actuator 265/397 by performing a virtual movement within the virtual environment. Even if an environment is virtual, VSLAM techniques may still be valuable, as the virtual environment can be unmapped and/or generated by a device other than the VSLAM device 205/305, such as a remote server or console associated with a video game or video game platform. In some cases, VSLAM may be performed in a virtual environment even by a VSLAM device 205/305 that has its own physical conveyance system that allows it to physically move about a physical environment. For example, VSLAM may be performed in a virtual environment to test whether a VSLAM device 205/305 is working properly without wasting time or energy on movement and without wearing out a physical conveyance system of the VSLAM device 205/305.

Figure 7C:
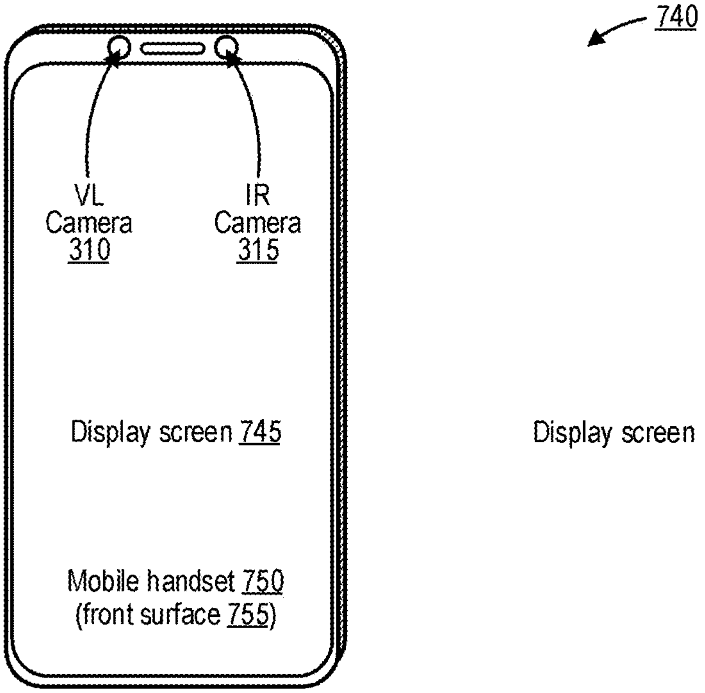
FIG. 7C is a perspective diagram illustrating a front surface of a mobile handset that performs VSLAM using front-facing cameras, in accordance with some examples.

FIG. 7C is a perspective diagram 740 illustrating a front surface 755 of a mobile handset 750 that performs VSLAM using front-facing cameras 310 and 315, in accordance with some examples. The mobile handset 750 may be, for example, a cellular telephone, a satellite phone, a portable gaming console, a music player, a health tracking device, a wearable device, a wireless communication device, a laptop, a mobile device, or a combination thereof. The front surface 755 of the mobile handset 750 includes a display screen 745. The front surface 755 of the mobile handset 750 includes a VL camera 310 and an IR camera 315. The VL camera 310 and the IR camera 315 are illustrated in a bezel around the display screen 745 on the front surface 755 of the mobile device 750. In some examples, the VL camera 310 and/or the IR camera 315 can be positioned a notch or cutout that is cut out from the display screen 745 on the front surface 755 of the mobile device 750. In some examples, the VL camera 310 and/or the IR camera 315 can be under-display cameras that are positioned between the display screen 210 and the rest of the mobile handset 750, so that light passes through a portion of the display screen 210 before reaching the VL camera 310 and/or the IR camera 315. The VL camera 310 and the IR camera 315 of the perspective diagram 740 are front-facing. The VL camera 310 and the IR camera 315 face a direction perpendicular to a planar surface of the front surface 755 of the mobile device 750.

Figure 7D:
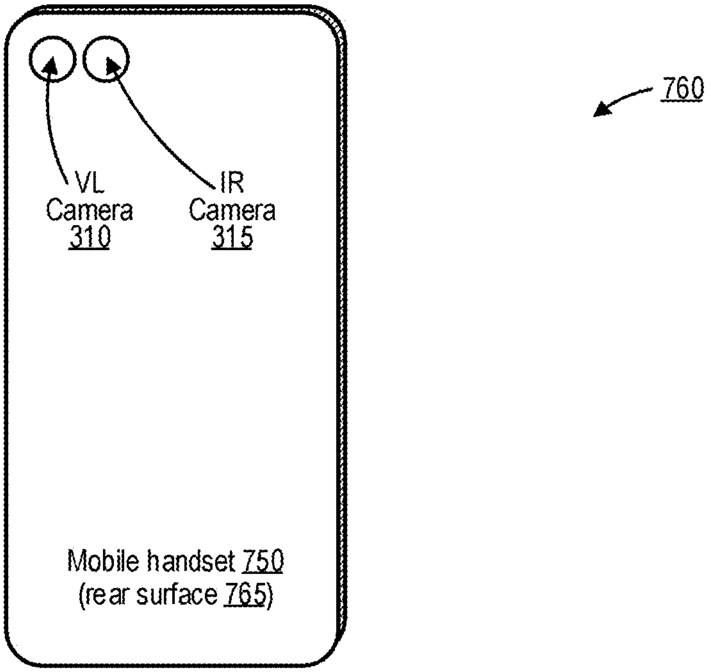
FIG. 7D is a perspective diagram illustrating a rear surface of a mobile handset that performs VSLAM using rear-facing cameras, in accordance with some examples.

FIG. 7D is a perspective diagram 760 illustrating a rear surface 765 of a mobile handset 750 that performs VSLAM using rear-facing cameras 310 and 315, in accordance with some examples. The VL camera 310 and an IR camera 315 of the perspective diagram 760 are rear-facing. The VL camera 310 and an IR camera 315 face a direction perpendicular to a planar surface of the rear surface 765 of the mobile device 750. While the rear surface 765 of the mobile handset 750 does not have a display screen 745 as illustrated in the perspective diagram 760, in some examples, the rear surface 765 of the mobile handset 750 may have a display screen 745. If the rear surface 765 of the mobile handset 750 has a display screen 745, any positioning of the VL camera 310 and the IR camera 315 relative to the display screen 745 may be used as discussed with respect to the front surface 755 of the mobile handset 750.

Like the HMD 710, the mobile handset 750 includes no wheels 615, propellers 625, or other conveyance of its own. Instead, the mobile handset 750 relies on the movements of a user holding or wearing the mobile handset 750 to move the mobile handset 750 about the environment. Thus, in some cases, the mobile handset 750, when performing a VSLAM technique, can skip path planning using the path planning engine 260/395 and/or movement actuation using the movement actuator 265/397. In some cases, the mobile handset 750 can still perform path planning using the path planning engine 260/395, and can indicate directions to follow a suggested path to the user to direct the user along the suggested path planned using the path planning engine 260/395. In some cases, for instance where the mobile handset 750 is used for AR, VR, MR, or XR, the environment may be entirely or partially virtual. In some cases, the mobile handset 750 may be slotted into a head-mounted device so that the mobile handset 750 functions as a display of HMD 710, with the display screen 745 of the mobile handset 750 functioning as the display of the HMD 710. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile handset 750. The movement actuator 265/397 may include any such input device. Movement through the virtual environment may not require wheels 615, propellers 625, legs, or any other form of conveyance. If the environment is a virtual environment, then the mobile handset 750 can still perform path planning using the path planning engine 260/395 and/or movement actuation 265/397. If the environment is a virtual environment, the mobile handset 750 can perform movement actuation using the movement actuator 265/397 by performing a virtual movement within the virtual environment.

The VL camera 310 as illustrated in FIG. 3, FIG. 4, FIG. 6A, FIG. 6B, FIG. 7A, FIG. 7B, FIG. 7C, and FIG. 7D may be referred to as a first camera 310. The IR camera 315 as illustrated in FIG. 3, FIG. 4, FIG. 6A, FIG. 6B, FIG. 7A, FIG. 7B, FIG. 7C, and FIG. 7D may be referred to as a second camera 315. The first camera 310 can be responsive to a first spectrum of light, while the second camera 315 is responsive to a second spectrum of light. While the first camera 310 is labeled as a VL camera throughout these figures and the descriptions herein, it should be understood that the VL spectrum is simply one example of the first spectrum of light that the first camera 310 is responsive to. While the second camera 315 is labeled as an IR camera throughout these figures and the descriptions herein, it should be understood that the IR spectrum is simply one example of the second spectrum of light that the second camera 315 is responsive to. The first spectrum of light can include at least one of at least part of the VL spectrum, at least part of the IR spectrum, at least part of the ultraviolent (UV) spectrum, at least part of the microwave spectrum, at least part of the radio spectrum, at least part of the X-ray spectrum, at least part of the gamma spectrum, at least part of the electromagnetic (EM) spectrum, or a combination thereof. The second spectrum of light can include at least one of at least part of the VL spectrum, at least part of the IR spectrum, at least part of the ultraviolent (UV) spectrum, at least part of the microwave spectrum, at least part of the radio spectrum, at least part of the X-ray spectrum, at least part of the gamma spectrum, at least part of the electromagnetic (EM) spectrum, or a combination thereof. The first spectrum of light may be distinct from the second spectrum of light. In some examples, the first spectrum of light and the second spectrum of light can in some cases lack any overlapping portions. In some examples, the first spectrum of light and the second spectrum of light can at least partly overlap.

FIG. 8 is a conceptual diagram 800 illustrating extrinsic calibration of a visible light (VL) camera 310 and an infrared (IR) camera 315. The extrinsic calibration engine 385 performs the extrinsic calibration of the VL camera 310 and the IR camera 315 while the VSLAM device is positioned in a calibration environment. The calibration environment includes a patterned surface 830 having a known pattern with one or more features at known positions. In some examples, the patterned surface 830 may have a checkerboard pattern as illustrated in the conceptual diagram 800 of FIG. 8. A checkerboard surface may be useful because it has regularly spaced features, such as the corners of each square on the checkerboard surface. A checkerboard pattern may be referred to as a chessboard pattern. In some examples, the patterned surface 830 may have another pattern, such as a crosshair, a quick response (QR) code, an ArUco marker, a pattern of one or more alphanumeric characters, or some combination thereof.

The VL camera 310 captures a VL image 810 depicting the patterned surface 830. The IR camera 315 captures an IR image 820 depicting the patterned surface 830. The features of the patterned surface 830, such as the square corners of the checkerboard pattern, are detected within the depictions of the patterned surface 830 in the VL image 810 and the IR image 820. A transformation 840 is determined that converts the 2D pixel coordinates (e.g., row and column) of each feature as depicted in the IR image 820 into the 2D pixel coordinates (e.g., row and column) of the same feature as depicted in the VL image 810. A transformation 840 may be determined based on the known actual position of the same feature in the actual patterned surface 830, and/or based on the known relative positioning of the feature relative to other features in the patterned surface 830. In some cases, the transformation 840 may also be used to map the 2D pixel coordinates (e.g., row and column) of each feature as depicted in the IR image 820 and/or in the VL image 810 to a three-dimensional (3D) set of coordinates of a map point in the environment with three coordinates that correspond to three spatial dimensions.

In some examples, the extrinsic calibration engine 385 builds the world frame for the extrinsic calibration on the top left corner of the checkerboard pattern. The transformation 840 can be a direct linear transform (DLT). Based on 3D-2D correspondences between the known 3D positions of the features on the patterned surface 830 and the 2D pixel coordinates (e.g., row and column) in the VL image 810 and the IR image 820, certain parameters can be identified. Parameters or variables representing matrices are referenced herein within square brackets ("[" and "]") for clarity. The brackets, in and of themselves, should be understood to not represent an equivalence class or any other mathematical concept. A camera intrinsic parameter $[K_{VL}]$ of the VL camera 310 and a camera intrinsic parameter $[K_{IR}]$ of the IR camera IR 315 can be determined based on properties of the VL camera 310 and the IR camera 315 and/or based on the 3D-2D correspondences. The camera pose of VL camera 310 during capture of the VL image 810, and the camera pose of the IR camera 315 during capture of the IR image 820 can be determined based on the 3D-2D correspondences. A variable $p_{VL}$, may represent a set of 2D coordinates of a point in the VL image 810. A variable $p_{IR}$ may represent a set of 2D coordinates of the corresponding point in the IR image 820.

Determining the transformation 840 may include solving for a rotation matrix R and/or a translation t using an equation $$[K_{IR}]\left([R]\times\frac{p_{VL}}{[K_{VL}]}+t\right)=p_{IR}.$$

Both $p_{IR}$ and $p_{BL}$ can be homogenous coordinates. Values for [R] and t may be determined so that the transformation 840 successfully transforms points $p_{IR}$ in the IR image 820 into points pr in the VL image 810 consistently, for example by solving this equation multiple times for different features of the patterned surface 830, using singular value decomposition (SVD), and/or using iterative optimization. Because the extrinsic calibration engine 385 can perform extrinsic calibration before the VSLAM device 205/305 is used to perform VSLAM, time and computing resources are generally not an issue in determining the transformation 840. In some cases, the transformation 840 may be similarly be used to transform a point $p_{VL}$ in the VL image 810 into points $p_{IR}$ in the IR image 820.

Figure 9:
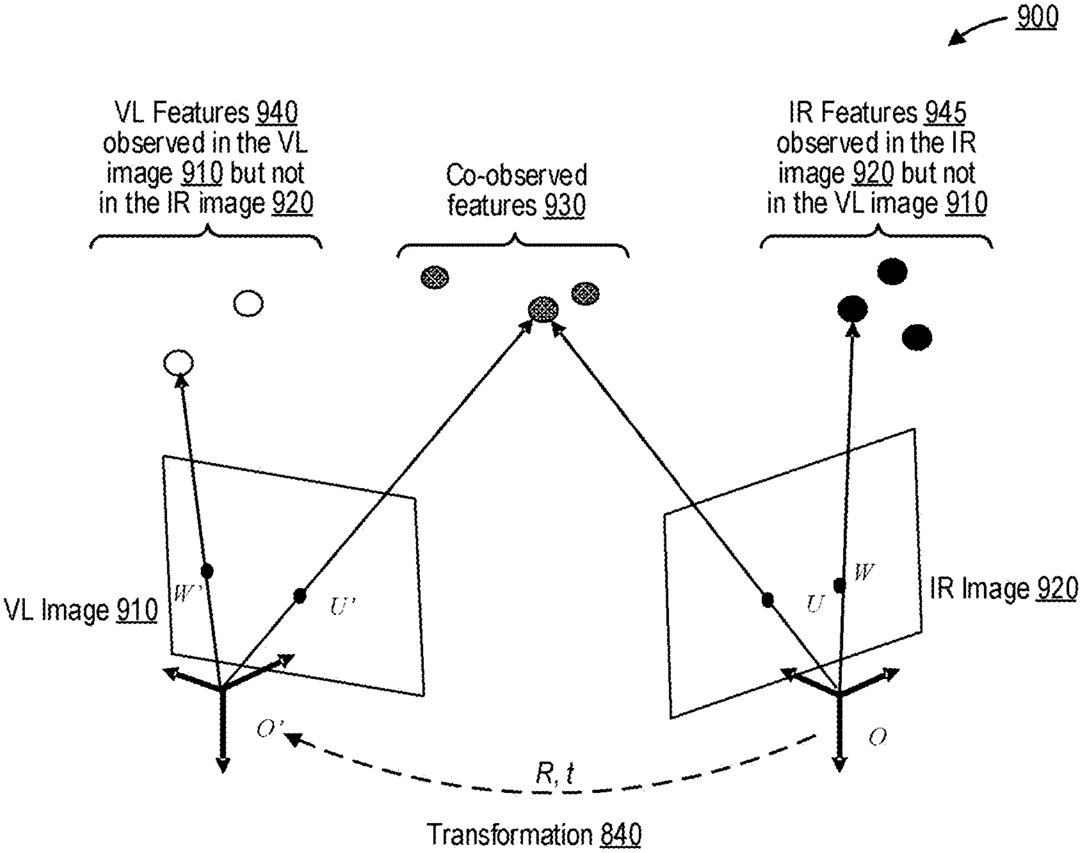
FIG. 9 is a conceptual diagram illustrating transformation between coordinates of a feature detected by an IR camera and coordinates of the same feature detected by a VL camera, in accordance with some examples.

FIG. 9 is a conceptual diagram 900 illustrating transformation 840 between coordinates of a feature detected by in an infrared (IR) image 920 captured by an IR camera 315 and coordinates of the same feature detected in a visible light (VL) image 910 captured by a VL camera 310. The conceptual diagram illustrates a number of features in an environment that is observed by the VL camera 310 and the IR camera 315. Three grey-patterned-shaded circles represent co-observed features 930 that are depicted in the VL image 910 and the IR image 920. The co-observed features 930 may be depicted, observed, and/or detected in the VL image 910 and the IR image 920 during feature extraction by a feature extraction engine 220/330/335. Three white-shaded circles represent VL features 940 that are depicted, observed, and/or detected in the VL image 910 but not in the IR image 920. The VL features 940 may be detected in the VL image 910 during VL feature extraction 330. Three black-shaded circles represent IR features 945 that are depicted, observed, and/or detected in the IR image 920 but not in the VL image 910. The IR features 945 may be detected in the IR image 920 during IR feature extraction 335.

A set of 3D coordinates for a map point for a co-observed feature of the co-observed features 930 may be determined based on the depictions of the co-observed feature in the VL image 910 and in the IR image 920. For instance, the set of 3D coordinates for a map point for the co-observed feature can be triangulated using a mid-point algorithm. A point O represents the IR camera 315. A point O' represents the VL camera 310. A point U along an arrow from point O to a co-observed feature of the co-observed features 930 represents the depiction of the co-observed feature in the IR image 920. A point U' along an arrow from point O' to a co-observed feature of the co-observed features 930 represents the depiction of the co-observed feature in the VL image 910.

A set of 3D coordinates for a map point for a VL feature of the VL features 940 can be determined based on the depictions of the VL feature in the VL image 910 and one or more other depictions of the VL feature in one or more other VL images and/or in one or more IR images. For instance, the set of 3D coordinates for a map point for the VL feature can be triangulated using a mid-point algorithm. A point W' along an arrow from point O' to a VL feature of the VL features 940 represents the depiction of the VL feature in the VL image 910.

A set of 3D coordinates for a map point for an IR feature of the IR features 945 can be determined based on the depictions of the IR feature in the IR image 920 and one or more other depictions of the IR feature in one or more other IR images and/or in one or more VL images. For instance, the set of 3D coordinates for a map point for the IR feature can be triangulated using a mid-point algorithm. A point W along an arrow from point O to an IR feature of the IR features 945 represents the depiction of the IR feature in the IR image 920.

In some examples, the transformation 840 may transform a 2D position of a feature detected in the IR image 920 into a 2D position in the perspective of the VL camera 310. The 2D position in the perspective of the VL camera 310 can be transformed into a set of 3D coordinates of a map point used in a map based on the pose of the VL camera 310. In some examples, a pose of the VL camera 310 associated with the first VL keyframe can be initialized by the mapping system 390 as an origin of the world frame of the map. A second VL keyframe captured by the VL camera 310 after the first VL keyframe is registered into the world frame of the map using a VSLAM technique illustrated in at least one of the conceptual diagrams 200, 300, and/or 400. An IR keyframe can be captured by the IR camera 315 at the same time, or within a same window of time, as the second VL keyframe. The window of time may last for a predetermined duration of time, such as one or more picoseconds, one or more nanoseconds, one or more milliseconds, or one or more seconds. The IR keyframe for triangulation to determine sets of 3D coordinates for map points (or partial map points) corresponding to co-observed features 930.

Figure 10A:
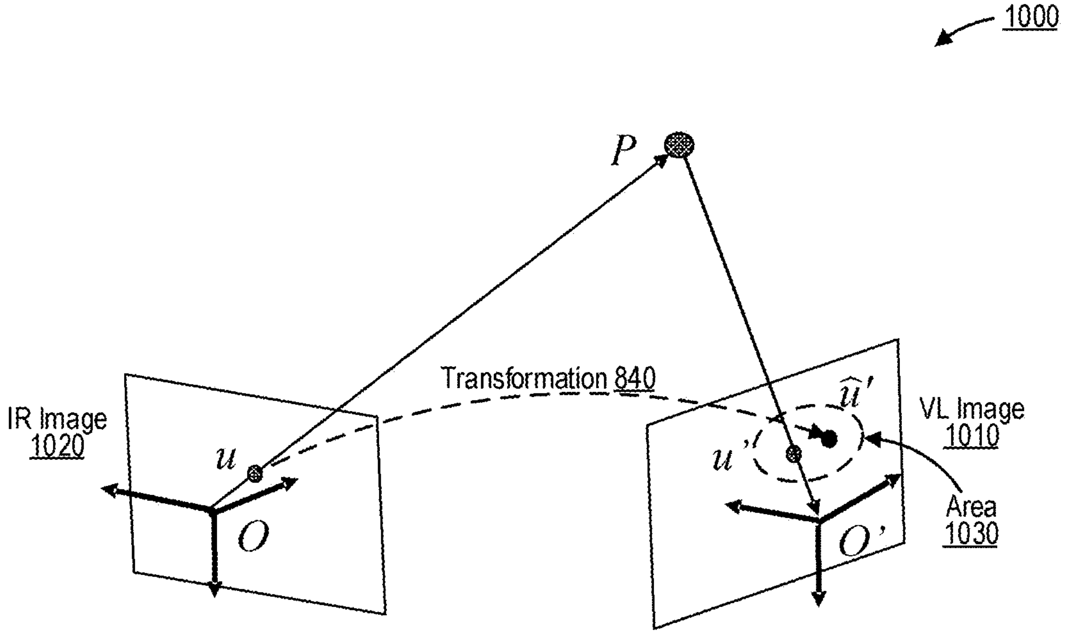
FIG. 10A is a conceptual diagram illustrating feature association between coordinates of a feature detected by an IR camera and coordinates of the same feature detected by a VL camera, in accordance with some examples.

FIG. 10A is a conceptual diagram 1000 illustrating feature association between coordinates of a feature detected by in an infrared (IR) image 1020 captured by an IR camera 315 and coordinates of the same feature detected in a visible light (VL) image 1010 captured by a VL camera 310. A grey-pattern-shaded circle marked P represents a co-observed feature P. A point u along an arrow from point O to the co-observed feature P represents the depiction of the co-observed feature P in the IR image 1020. A point u' along an arrow from point O' to a co-observed feature P represents the depiction of the co-observed feature P in the VL image 1010.

The transformation 840 may be used on the point u in the IR image 1020, which may produce the point û' illustrated in the VL image 1010. In some examples, VL/IR feature association 365 may identify that the points u and u' represent the co-observed feature P by searching within an area 1030 around the position of the point u' of the VL image 1010 for a match for the point u' in the IR image 1020 based on points transformed from the IR image 1020 to the VL image 1010 using the transformation 840, and determining that the point û' within the area 1030 matches the point u'. In some examples, VL/IR feature association 365 may identify that the points u and u' represent the co-observed feature P by searching within an area 1030 around the position of the point û' transformed into the VL image 1010 from the IR image 1020 for a match for the point û', and determining that the point u' within the area 1030 matches the point û'.

Figure 10B:
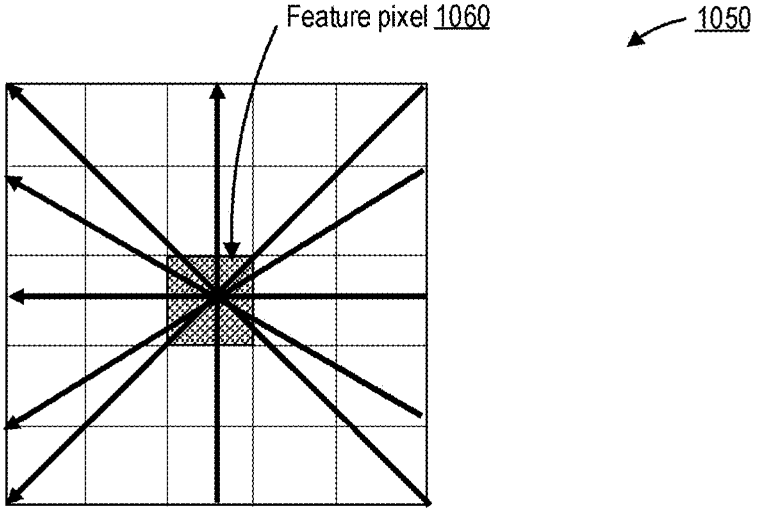
FIG. 10B is a conceptual diagram illustrating an example descriptor pattern for a feature, in accordance with some examples.

FIG. 10B is a conceptual diagram 1050 illustrating an example descriptor pattern for a feature. Whether the points u' and û' match may be determined based on whether the descriptor patterns associated with the points u' and û' match within a predetermined maximum percentage variation of one another. The descriptor pattern includes a feature pixel 1060, which is a point representing the feature. The descriptor pattern includes a number of pixels around the feature pixel 1060. The example descriptor pattern illustrated in the conceptual diagram 1050 takes the form of a 5 pixel by 5 pixel square of pixels with the feature pixel 1060 in the center of the descriptor pattern. Different descriptor pattern shapes and/or sizes may be used. In some examples, a descriptor pattern may be a 3 pixel by 3 pixel square of pixels with the feature pixel 1060 in the center. In some examples, a descriptor pattern may be a 7 pixel by 7 pixel square of pixels, or a 9 pixel by 9 pixel square of pixels, with the feature pixel 1060 in the center. In some examples, a descriptor pattern may be a circle, an oval, an oblong rectangle, or another shape of pixels with the feature pixel 1060 in the center.

The descriptor pattern includes 5 black arrows that each pass through the feature pixel 1060. Each of the black arrows passes from one end of the descriptor pattern to an opposite end of the descriptor pattern. The black arrows represent intensity gradients around the feature pixel 1060, and may be derived in the direction of the arrows. The intensity gradients may correspond to differences in luminosity of the pixels along each arrow. If the VL image is in color, each intensity gradient may correspond to differences in color intensity of the pixels along each arrow in one of a set of color (e.g., red, green, blue). The intensity gradients may be normalized so as to fall within a range between 0 and 1. The intensity gradients may be ordered according to the directions that their corresponding arrows face, and may be concatenated into a histogram distribution. In some examples, the histogram distribution may be stored into a 256-bit length binary string.

As noted above, whether the points u' and û' match may be determined based on whether the descriptor patterns associated with the points u' and û' match within a predetermined maximum percentage variation of one another. In some examples, the binary string storing the histogram distribution corresponding to the descriptor pattern for the point u' may be compared to the binary string storing the histogram distribution corresponding to the descriptor pattern for the point û'. In some examples, if the binary string corresponding to the point u' differs from the binary string corresponding to the point û' by less than a maximum percentage variation, the points u' and û' are determined to match, and therefore depict the same feature P. In some examples, the maximum percentage variation may be 5%, 10%, 15%, 20%, 25%, less than 5%, more than 25%, or a percentage value between any two of the previously listed percentage values. If the binary string corresponding to the point u' differs from the binary string corresponding to the point û' by more than a maximum percentage variation, the points u' and û' are determined not to match, and therefore do not depict the same feature P.

Figure 11:
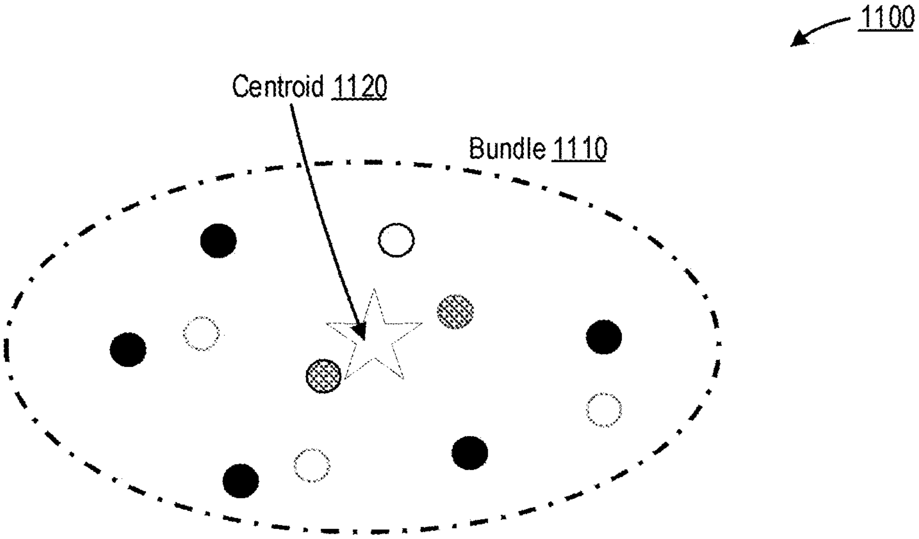
FIG. 11 is a conceptual diagram illustrating an example of joint map optimization, in accordance with some examples.

FIG. 11 is a conceptual diagram 1100 illustrating an example of joint map optimization 360. The conceptual diagram 1100 illustrates a bundle 1110 of points. The bundle 1110 includes points shaded in patterned grey that represent co-observed features observed by both the VL camera 310 and the IR camera 315, either at the same time or at different times, as determined using VL/IR feature association 365. The bundle 1110 includes points shaded in white that represent features observed by the VL camera 310 but not by the IR camera 315. The bundle 1110 includes points shaded in black that represent features observed by the IR camera 315 but not by the VL camera 310.

Bundle adjustment (BA) is an example technique for performing joint map optimization 360. A cost function can be used for BA, such as a re-projection error of 2D points into 3D map points, as an objective for optimization. The joint map optimization engine 360 can modify keyframe poses, and/or map points information using BA to minimize the re-projection error according to the residual gradients. In some examples, VL map points 350 and IR map points 355 may be optimized separately. However, map optimization using BA can be computationally intensive. Thus, VL map points 350 and IR map points 355 may be optimized together rather than separately by the joint map optimization engine 360. In some examples, re-projection error item generated from IR, RGB channel or both will be put into the objective loss function for BA.

In some cases, a local search window represented by the bundle 1110 may be determined based on the map points corresponding to the co-observed features shaded in patterned grey in the bundle 1110. Other map points, such as those only observed by the VL camera 310 shaded in white or those only observed by the IR camera 315 shaded in black, may be ignored or discarded in the loss function, or may be weighted less than the co-observed features. After BA optimization, if the map points in the bundle are distributed very close to each other, a centroid 1120 of these map points in the bundle 1110 can be calculated. In some examples, the position of the centroid 1120 is calculated to be at the center of the bundle 1110. In some examples, the position of the centroid 1120 is calculated based on an average of the positions of the points in the bundle 1110. In some examples, the position of the centroid 1120 is calculated based on a weighted average of the positions of the points in the bundle 1110, where some points (e.g., co-observed points) are weighted more heavily than other points (e.g., points that are not co-observed). The centroid 1120 is represented by a star in the conceptual diagram 1100 of FIG. 11. The centroid 1120 can then be used as a map point for the map by the mapping system 390, and the other points in the bundle can be discarded from the map by the mapping system 390. Use of the centroid 1120 supports consistently spatial optimization and avoids redundant computation for points with similar descriptors, or points that are distributed narrowly (e.g., distributed within a predetermined range of one another).

Figure 12:
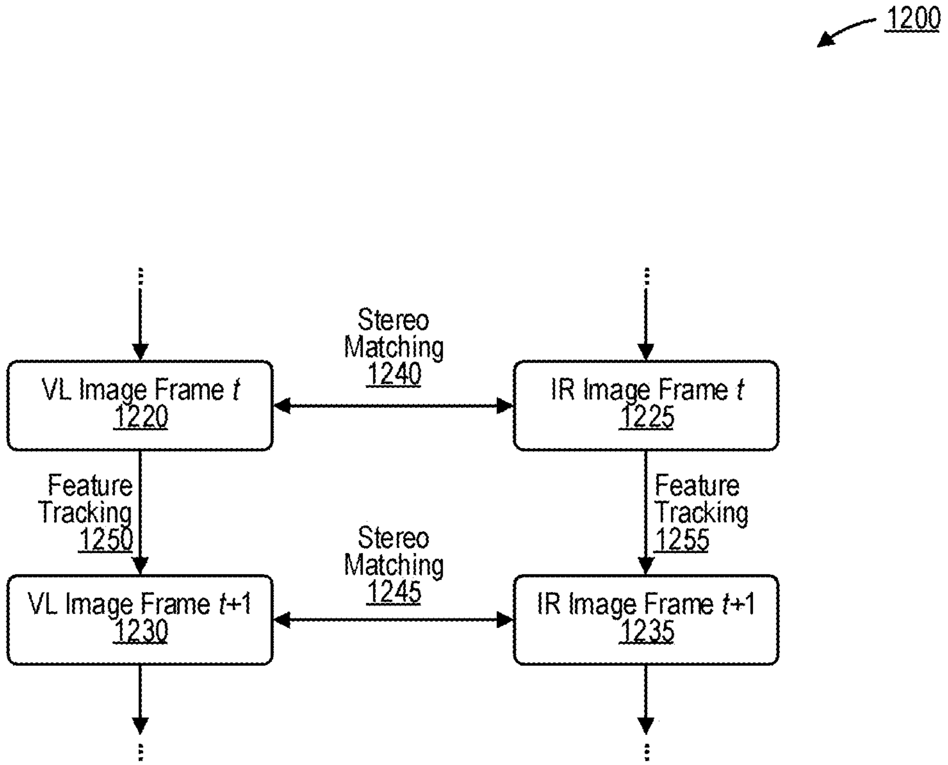
FIG. 12 is a conceptual diagram illustrating feature tracking and stereo matching, in accordance with some examples.

FIG. 12 is a conceptual diagram 1200 illustrating feature tracking 1250/1255 and stereo matching 1240/1245. The conceptual diagram 1200 illustrates a VL image frame t 1220 captured by the VL camera 310. The conceptual diagram 1200 illustrates a VL image frame t+1 1230 captured by the VL camera 310 after capture of the VL image frame t 1220. One or more features are depicted in both the VL image frame t 1220 and the VL image frame t+1 1230, and feature tracking 1250 tracks the change in position of these one or more features from the VL image frame t 1220 to the VL image frame t+1 1230.

The conceptual diagram 1200 illustrates a IR image frame t 1225 captured by the IR camera 315. The conceptual diagram 1200 illustrates a IR image frame t+1 1235 captured by the IR camera 315 after capture of the IR image frame t 1225. One or more features are depicted in both the IR image frame t 1225 and the IR image frame t+1 1235, and feature tracking 1255 tracks the change in position of these one or more features from the IR image frame t 1225 to the IR image frame t+1 1235.

The VL image frame t 1220 may be captured at the same time as the IR image frame t 1225. The VL image frame t 1220 may be captured within a same window of time as the IR image frame t 1225. Stereo matching 1240 matches one or more features depicted in the VL image frame t 1220 with matching features depicted in the IR image frame t 1225. Stereo matching 1240 identifies features that are co-observed in the VL image frame t 1220 and the IR image frame t 1225. Stereo matching 1240 may use the transformation 840 as illustrated in and discussed with respect to the conceptual diagrams 1000 and 1050 of FIG. 10A and FIG. 10B. The transformation 840 may be used in either or both directions, transforming points corresponding to features their representation in the VL image frame t 1220 to a corresponding representation in the IR image frame t 1225 and/or vice versa.

The VL image frame t+1 1230 may be captured at the same time as the IR image frame t+1 1235. The VL image frame t+1 1230 may be captured within a same window of time as the IR image frame t+1 1235. Stereo matching 1245 matches one or more features depicted in the VL image frame t+1 1230 with matching features depicted in the IR image frame t+1 1235. Stereo matching 1240 may use the transformation 840 as illustrated in and discussed with respect to the conceptual diagrams 1000 and 1050 of FIG. 10A and FIG. 10B. The transformation 840 may be used in either or both directions, transforming points corresponding to features their representation in the VL image frame t+1 1230 to a corresponding representation in the IR image frame t+1 1235 and/or vice versa.

Correspondence of VL map points 350 to IR map points 355 can be established during stereo matching 1240/1245. Similarly, correspondence of VL keyframes and IR keyframes can be established during stereo matching 1240/1245.

Figure 13A:
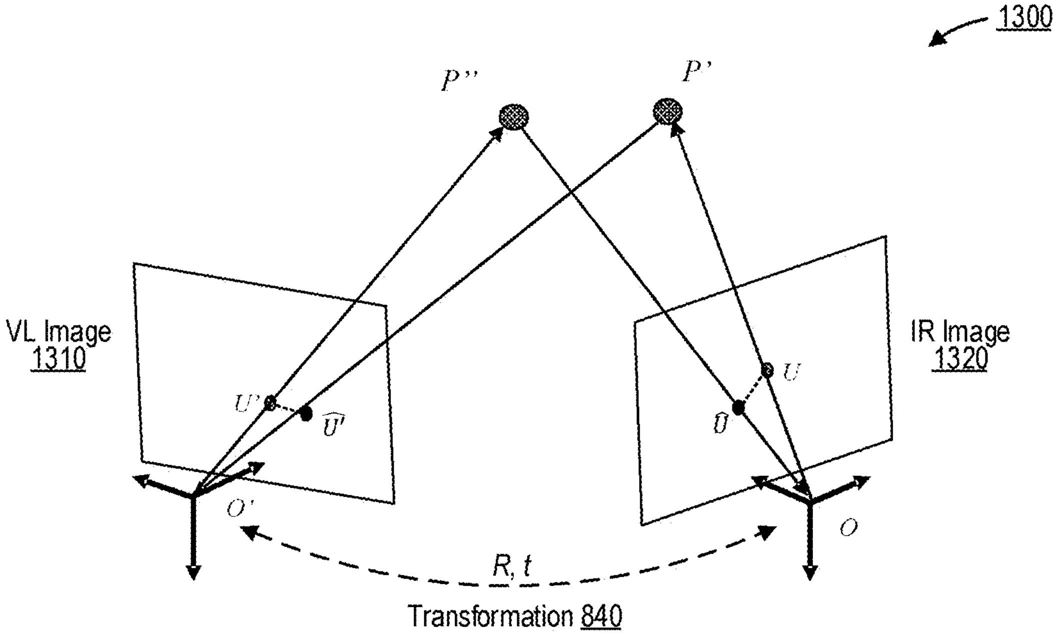
FIG. 13A is a conceptual diagram illustrating stereo matching between coordinates of a feature detected by an IR camera and coordinates of the same feature detected by a VL camera, in accordance with some examples.

FIG. 13A is a conceptual diagram 1300 illustrating stereo matching between coordinates of a feature detected in an infrared (IR) image 1320 captured by an IR camera 315 and coordinates of the same feature detected in a visible light (VL) image 1310 captured by a VL camera 310. The 3D points P' and P" represent observed sample locations of the same feature. A more accurate location P of the feature is later determined through the triangulation illustrated in the conceptual diagram 1350 of FIG. 13B.

The 3D point P" represents the feature observed in the VL camera frame O' 1310. Because the depth scale of feature is unknown, P" is sampled evenly along the line O'U' in front of VL image frame 1310. The point Û in the IR image 1320 represents the point U' transformed into the IR channel via the transformation 840, [R] and t, $C_{VL}$ is the 3D VL camera position of VSLAM output, $[T_{VL}]$ is transform matrix derived from VSLAM output, including both orientation and position. $[K_{IR}]$ is the intrinsic matrix for IR camera. Many P" samples are projected onto the IR image frame 1320, then a search within the windows of these projected samples Û is performed, to find the corresponding feature observation in IR image frame 1320, with similar descriptor. Then the best sample Û and its corresponding 3D point P" are chosen according to the minimal reprojection error. Thus, the final transformation from the point P" in the VL camera frame 1310 to the point Û in the IR image 1320 can be written as below:

$$[K_{IR}]\left(\frac{P'' \times [T_{VL}]}{[R] \times C_{VL} + t}\right) = \hat{U}$$

The 3D point P' represents the feature observed in the IR camera frame 1320. The point $\widehat{U'}$ in the VL image 1310 represents the point U transformed into the VL channel via the inverse of transformation 840, [R] and t, $C_{IR}$ is the 3D IR camera position of VSLAM output, $[T_{IR}]$ is transform matrix derived from VSLAM output, including both orientation and position. $[K_{VL}]$ is the intrinsic matrix for VL camera. Many P' samples are projected onto the VL image frame 1310, then a search within the windows of these projected samples $\widehat{U'}$ is performed, to find the corresponding feature observation in VL image frame 1310, with similar descriptor. Then the best sample $\widehat{U'}$ and its corresponding 3D sample point P' are chosen according to the minimal reprojection error. Thus, the final transformation from the point P' in the IR camera frame 1320 to the point $\widehat{U'}$ in the VL image 1310 can be written as below:

$$[K_{VL}]\left(\frac{P' \times [T_{IR}]}{[R]_{-1} \times (C_{IR} + t)}\right) = \hat{U}'$$

A set of 3D coordinates for the location point P' for the feature is determined based on an intersection of a first line drawn from point O through point U and a second line drawn from point O' through point Û'. A set of 3D coordinates for the location point P" for the feature is determined based on an intersection of a third line drawn from point O' through point U' and a second line drawn from point O through point Û.

Figure 13B:
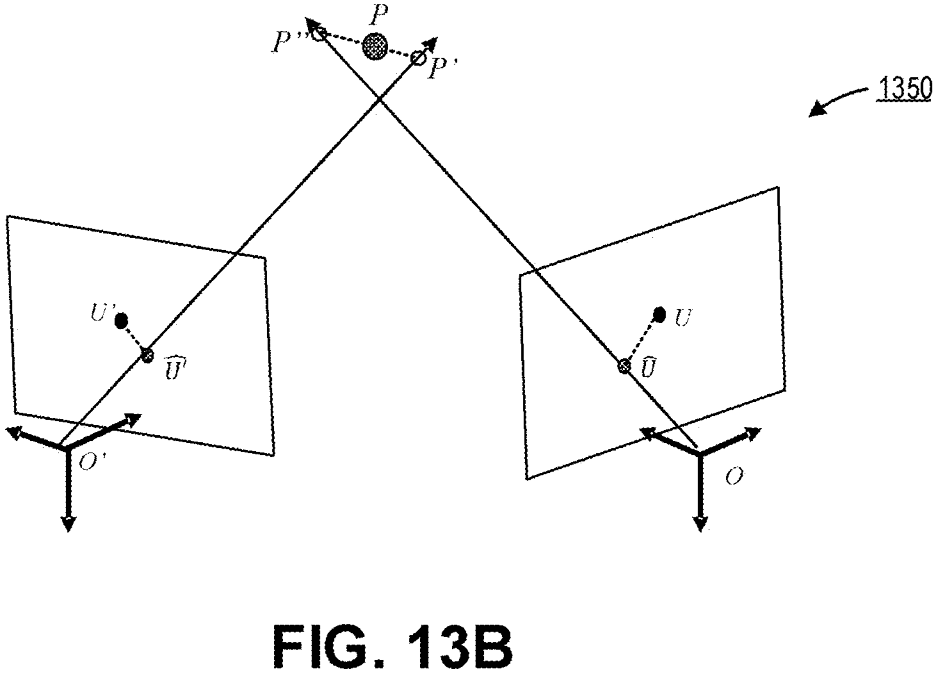
FIG. 13B is a conceptual diagram illustrating triangulation between coordinates of a feature detected by an IR camera and coordinates of the same feature detected by a VL camera, in accordance with some examples.

FIG. 13B is a conceptual diagram 1350 illustrating triangulation between coordinates of a feature detected in an infrared (IR) image captured by an IR camera and coordinates of the same feature detected in a visible light (VL) image captured by a VL camera. Based on the stereo matching transformations illustrated in the conceptual diagram 1300 of FIG. 13A, a location point P' for a feature is determined. Based on the stereo matching transformations, a location point P" for the same feature is determined. In the triangulation operation illustrated in the conceptual diagram 1350, a line segment is drawn from point P' to point P". In the conceptual diagram 1350, the line segment is represented by a dotted line. A more accurate location P for the feature is determined to be the midpoint along the line segment.

Figure 14A:
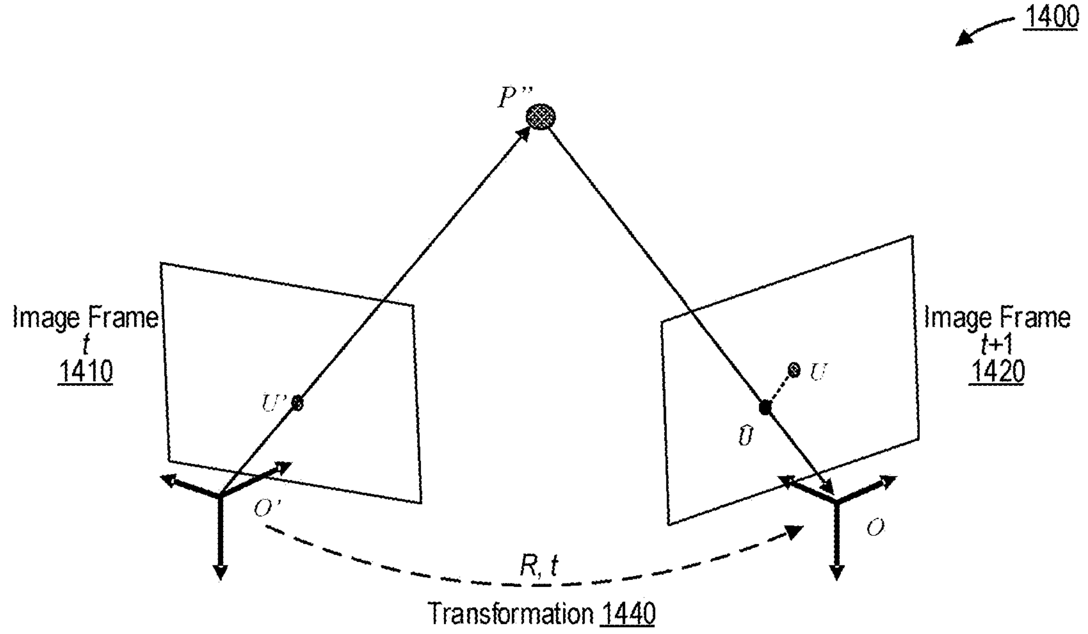
FIG. 14A is a conceptual diagram illustrating monocular-matching between coordinates of a feature detected by a camera in an image frame and coordinates of the same feature detected by the camera in a subsequent image frame, in accordance with some examples.

FIG. 14A is a conceptual diagram 1400 illustrating monocular-matching between coordinates of a feature detected by a camera in an image frame t 1410 and coordinates of the same feature detected by the camera in a subsequent image frame t+1 1420. The camera may be a VL camera 310 or an IR camera 315. The image frame t 1410 is captured by the camera while the camera is at a pose C' illustrated by the coordinate O'. The image frame t+1 1420 is captured by the camera while the camera is at a pose C illustrated by the coordinate O.

The point P" represents the feature observed by the camera during capture of the image frame t 1410. The point U' in the image frame t 1410 represents the feature observation of the point P" within the image frame t 1410. The point Û in the image frame t+1 1420 represents the point U' transformed into the image frame t+1 1s420 via a transformation 1440, including [R] and t. The transformation 1440 may be similar to the transformation 840. C is the camera position of image frame t 1410, [T] is transform matrix generated from motion prediction, including both orientation and position. [K] is the intrinsic matrix for corresponding camera. Many P" samples are projected onto the image frame t+1 1420, then a search within the windows of these projected samples Û is performed, to find the corresponding feature observation in image frame t+1 1420, with identical descriptor. Then the best sample Û and its corresponding 3D sample point P" are chosen according to the minimal reprojection error. Thus, the final transformation 1440 from the point P" in the camera frame t 1410 to the point Û in the image frame t+1 1420 can be written as below:

$$[K]\left(\frac{P'' \times [T]}{[R] \times C + t}\right) = \hat{U}$$

Unlike the transformation 840 used for stereo matching, R and t for the transformation 1440 may be determined based on prediction through a constant velocity model v×Δt based on a velocity of the camera between capture of a previous image frame t−1 (not pictured) and the image frame t 1410.

Figure 14B:
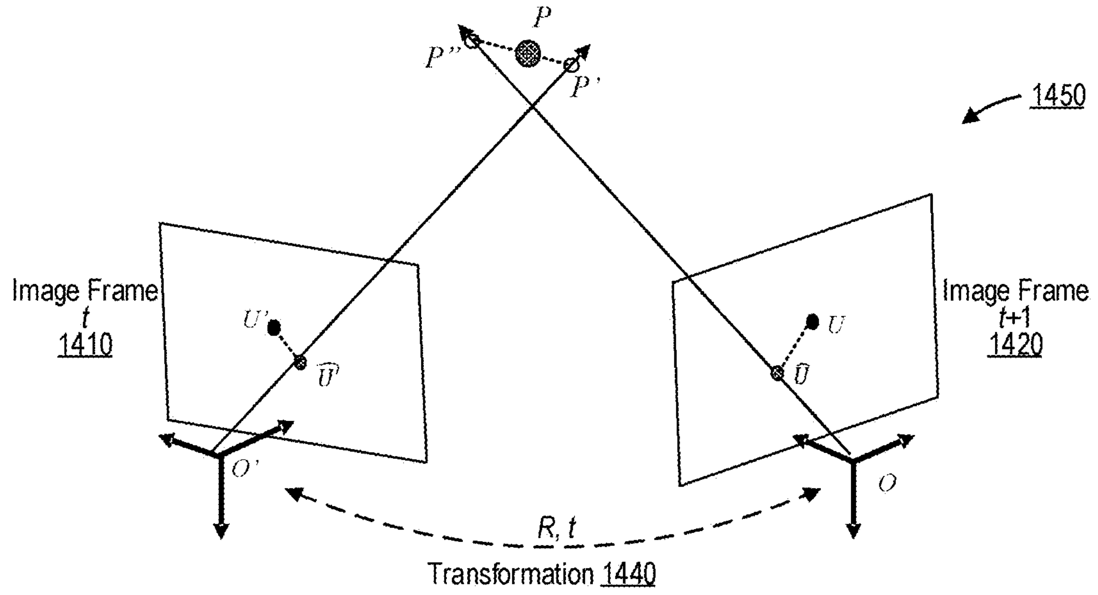
FIG. 14B is a conceptual diagram illustrating triangulation between coordinates of a feature detected by a camera in an image frame and coordinates of the same feature detected by the camera in a subsequent image frame, in accordance with some examples.

FIG. 14B is a conceptual diagram 1450 illustrating triangulation between coordinates of a feature detected by a camera in an image frame and coordinates of the same feature detected by the camera in a subsequent image frame.

A set of 3D coordinates for the location point P' for the feature is determined based on an intersection of a first line drawn from point O through point U and a second line drawn from point O' through point Û'. A set of 3D coordinates for the location point P" for the feature is determined based on an intersection of a third line drawn from point O' through point U' and a second line drawn from point O through point Û. In the triangulation operation illustrated in the conceptual diagram 1450, a line segment is drawn from point P' to point P". In the conceptual diagram 1450, the line segment is represented by a dotted line. A more accurate location P for the feature is determined to be the midpoint along the line segment.

Figure 15:
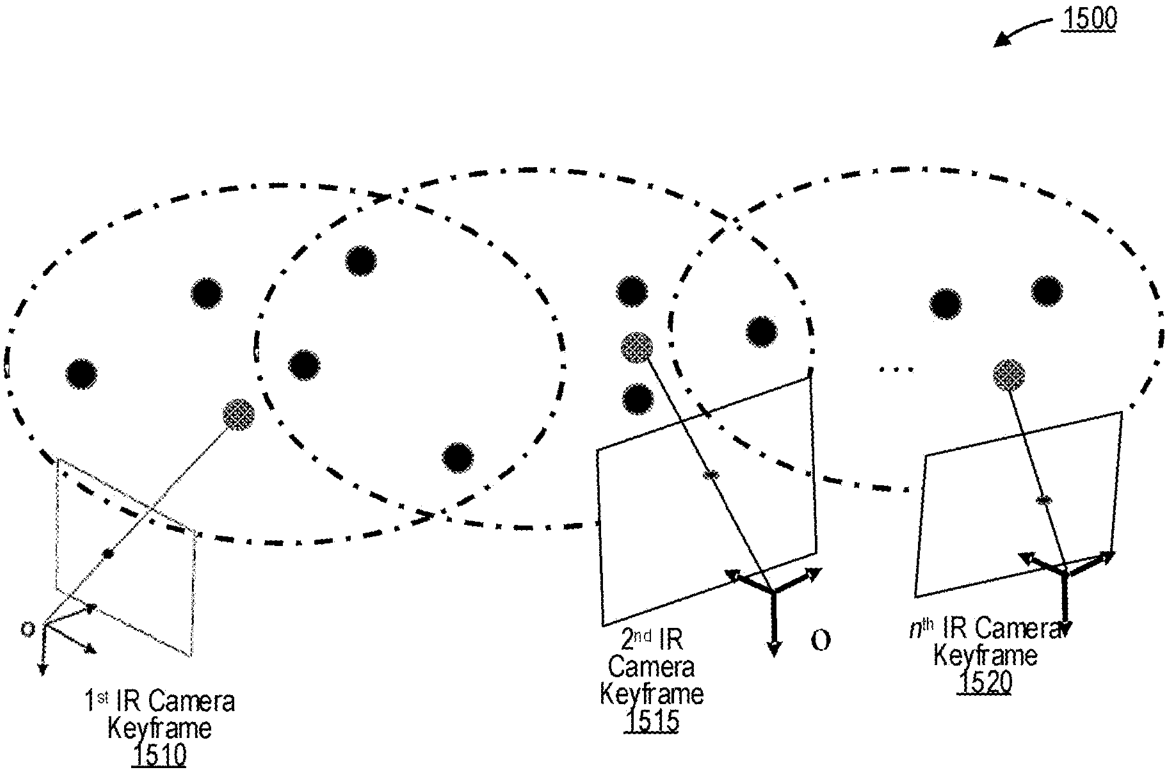
FIG. 15 is a conceptual diagram illustrating rapid relocalization based on keyframes.

FIG. 15 is a conceptual diagram 1500 illustrating rapid relocalization based on keyframes. Relocalization using keyframes as in the conceptual diagram 1500 speeds up relocalization and improve success rate in nighttime mode (the VSLAM technique illustrated in the conceptual diagram 400 of FIG. 4). Relocalization using keyframes as in the conceptual diagram 1500 retains speed and high success rate in daytime mode (the VSLAM technique illustrated in the conceptual diagram 300 of FIG. 3).

The circles shaded with a grey pattern in the conceptual diagram 1500 represent 3D map points for features that are observed by the IR camera 315 during nighttime mode. The circles shaded black in the conceptual diagram 1500 represent 3D map points for features that are observed during daytime mode by the VL camera 310, the IR camera 315, or both. To help overcome feature sparsity in nighttime mode, the unobserved map points within a range of currently observed map points by the IR camera 315 may also be retrieved to help relocalization.

In the relocalization algorithm illustrated in the conceptual diagram 1500, a current IR image captured by the IR camera 315 is compared to other IR camera keyframes to find the match candidates with most common descriptors in the keyframe image, indicated by the Bag of Words scores (BoWs) above a predetermined threshold. For example, all the map points belonging to the current IR camera keyframe 1510 are matched against submaps in conceptual diagram 1500, composed of the map points of candidate keyframes (not pictured) as well as the map points of the candidate keyframes' adjacent keyframes (not pictured). These submaps include both observed and unobserved points in the keyframe view. The map points of each following consecutive IR camera keyframe 1515, and an nth IR camera keyframe 1520 are matched against this submap map points in conceptual diagram 1500. The submap map points can include both the map points of the candidate keyframes and the map points of the candidate keyframes' adjacent keyframes. In this way, the relocalization algorithm can verify the candidate keyframes by consistent matching between multiple consecutive IR keyframes against the submaps. Here, the search algorithm retrieves an observed map point and its neighboring unobserved map points in a certain range area, like the leftmost dashed circle area in FIG. 15. Finally, the best candidate keyframe is chosen when its submap can be matched consistently with the map points of consecutive IR keyframes. This matching may be performed on-the-fly. Because more 3D map point information is employed for the match process, the relocalization can be more accurate than it would be without this additional map point information.IR camera keyframe, a later IR camera keyframe after the fifth IR camera keyframe, or another IR camera keyframe.

Figure 16:
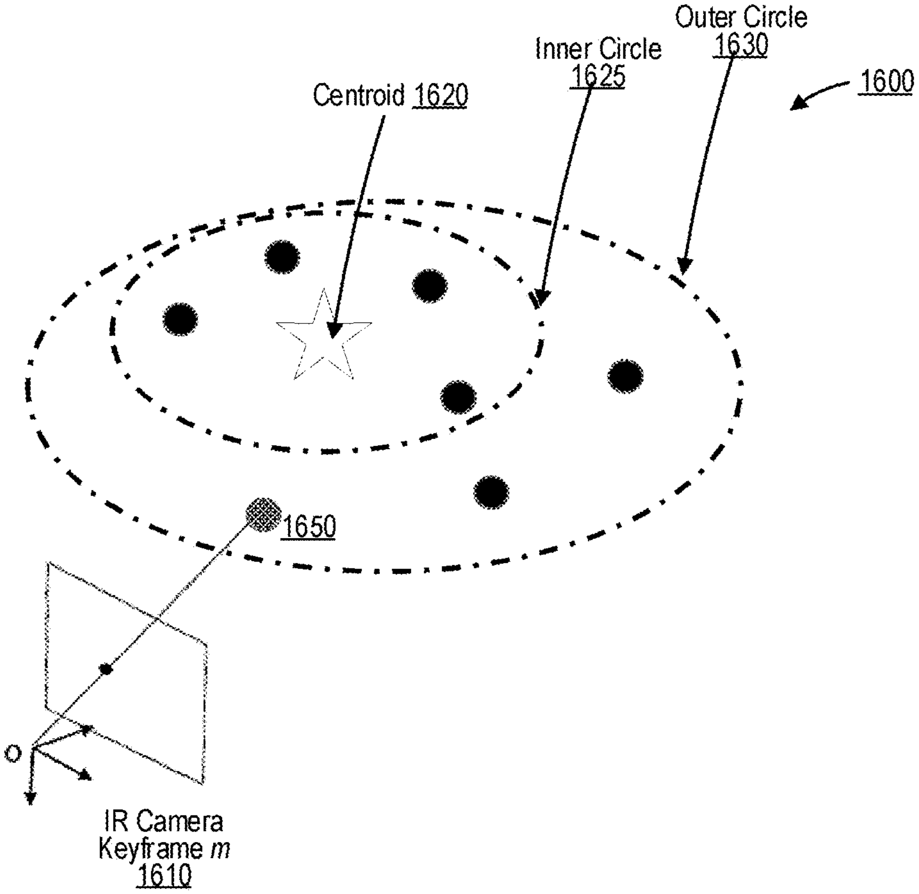
FIG. 16 is a conceptual diagram illustrating rapid relocalization based on keyframes and a centroid point, in accordance with some examples.

FIG. 16 is a conceptual diagram 1600 illustrating rapid relocalization based on keyframes (e.g., IR camera keyframe m 1610) and a centroid 1620 (also referred to as a centroid point). As in the conceptual diagram 1500, the circle 1650 shaded with a grey pattern in the conceptual diagram 1600 represents a 3D map point for a feature that is observed by the IR camera 315 during nighttime mode in the IR camera keyframe m 1610. The circles shaded black in the conceptual diagram 1600 represent 3D map points for features that are observed during daytime mode by the VL camera 310, the IR camera 315, or both.

The star shaded in white represents a centroid 1620 generated based on the four black points in the inner circle 1625 of the conceptual diagram 1600. The centroid 1620 may be generated based on the four black points in the inner circle 1625 because the four black points in the inner circle 1625 were not very close to one another in 3D space and these map points all have similar descriptors.

The relocalization algorithm may compare the feature corresponding to the circle 1650 to other features in the outer circle 1630. Because the centroid 1620 has been generated, the relocalization algorithm may discard the four black points in the inner circle 1625 for the purposes of relocalization, since considering all four black points in the inner circle 1625 would be repetitive. In some examples, the relocalization algorithm may compare the feature corresponding to the circle 1650 to the centroid 1620 rather than to any of the four black points in the inner circle 1625. In some examples, the relocalization algorithm may compare the feature corresponding to the circle 1650 to only one of the four black points in the inner circle 1625 rather than to all four of the black points in the inner circle 1625. In some examples, the relocalization algorithm may compare the feature corresponding to the circle 1650 to neither the centroid 1620 nor to any of the four black points in the inner circle 1625. In any of these examples, fewer computational resources are used by the relocalization algorithm.

The rapid relocalization techniques illustrated in the conceptual diagram 1500 of FIG. 15 and in the conceptual diagram 1600 of FIG. 16 may be examples of the relocalization 230 of the VSLAM technique illustrated in the conceptual diagram 200 of FIG. 2, of the relocalization 375 of the VSLAM technique illustrated in the conceptual diagram 300 of FIG. 3, and/or of the relocalization 375 of the VSLAM technique illustrated in the conceptual diagram 400 of FIG. 4.

The various VL images (810, 910, 1010, 1220, 1230, 1310) in FIG. 8, FIG. 9, FIG. 10A, FIG. 12, FIG. 13A, and FIG. 13B may each be referred to as a first image, or as a first type of image. Each of the first type of image may be an image captured by a first camera 310.

The various IR images (820, 920, 1020, 1225, 1235, 1320, 1510, 1515, 1520, 1610) in FIG. 8, FIG. 9, FIG. 10A, FIG. 12, FIG. 13A, FIG. 13B, FIG. 15, and FIG. 16 may each be referred to as a second image, or as a second type of image. Each of the second type of image may be an image captured by a second camera 315. The first camera 310 can be responsive to a first spectrum of light, while the second camera 315 is responsive to a second spectrum of light. While the first camera 310 is sometimes referred to herein as a VL camera 310, it should be understood that the VL spectrum is simply one example of the first spectrum of light that the first camera 310 is responsive to. While the second camera 315 is sometimes referred to herein as an IR camera 315, it should be understood that the IR spectrum is simply one example of the second spectrum of light that the second camera 315 is responsive to. The first spectrum of light can include at least one of at least part of the VL spectrum, at least part of the IR spectrum, at least part of the ultraviolent (UV) spectrum, at least part of the microwave spectrum, at least part of the radio spectrum, at least part of the X-ray spectrum, at least part of the gamma spectrum, at least part of the electromagnetic (EM) spectrum, or a combination thereof. The second spectrum of light can include at least one of: at least part of the VL spectrum, at least part of the IR spectrum, at least part of the ultraviolent (UV) spectrum, at least part of the microwave spectrum, at least part of the radio spectrum, at least part of the X-ray spectrum, at least part of the gamma spectrum, at least part of the electromagnetic (EM) spectrum, or a combination thereof. The first spectrum of light may be distinct from the second spectrum of light. In some examples, the first spectrum of light and the second spectrum of light can in some cases lack any overlapping portions. In some examples, the first spectrum of light and the second spectrum of light can at least partly overlap.

Figure 17:
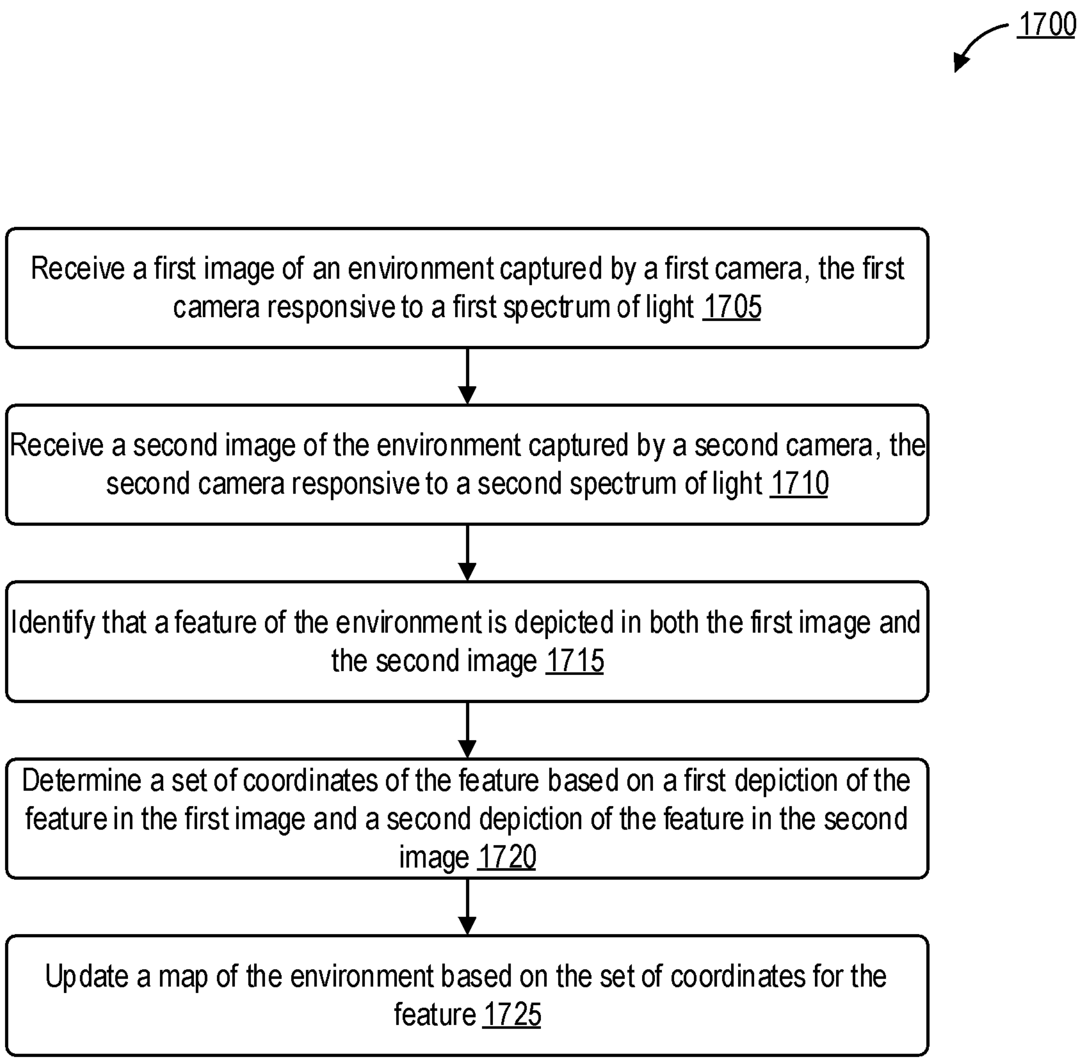
FIG. 17 is a flow diagram illustrating an example of an image processing technique, in accordance with some examples.

FIG. 17 is a flow diagram 1700 illustrating an example of an image processing technique. The image processing technique illustrated by the flow diagram 1700 of FIG. 17 may be performed by a device. The device may be an image capture and processing system 100, an image capture device 105A, an image processing device 105B, a VSLAM device 205, a VSLAM device 305, a UGV 610, a UAV 620, an XR headset 710, one or more remote servers, one or more network servers of a cloud service, a computing system 1800, or some combination thereof.

At operation 1705, the device receives a first image of an environment captured by a first camera. The first camera is responsive to a first spectrum of light. At operation 1710, the device receives a second image of the environment captured by a second camera. The second camera is responsive to a second spectrum of light. The device can include the first camera, the second camera, or both. The device can include one or more additional cameras and/or sensors other than the first camera and the second camera. In some aspects, the device includes at least one of a mobile handset, a head-mounted display (HAMD), a vehicle, and a robot.

The first spectrum of light may be distinct from the second spectrum of light. In some examples, the first spectrum of light and the second spectrum of light can in some cases lack any overlapping portions. In some examples, the first spectrum of light and the second spectrum of light can at least partly overlap. In some examples, the first camera is the first camera 310 discussed herein. In some examples, the first camera is the VL camera 310 discussed herein. In some aspects, the first spectrum of light is at least part of a visible light (VL) spectrum, and the second spectrum of light is distinct from the VL spectrum. In some examples, the first camera is the second camera 315 discussed herein. In some examples, the first camera is the IR camera 315 discussed herein. In some aspects, the second spectrum of light is at least part of an infrared (IR) light spectrum, and wherein the first spectrum of light is distinct from the IR light spectrum. Either one of the first spectrum of light and the second spectrum of light can include at least one of at least part of the VL spectrum, at least part of the IR spectrum, at least part of the ultraviolent (UV) spectrum, at least part of the microwave spectrum, at least part of the radio spectrum, at least part of the X-ray spectrum, at least part of the gamma spectrum, at least part of the electromagnetic (EM) spectrum, or a combination thereof.

In some examples, the first camera captures the first image while the device is in a first position, and wherein the second camera captures the second image while the device is in the first position. The device can determine, based on the set of coordinates for the feature, a set of coordinates of the first position of the device within the environment. The set of coordinates of the first position of the device within the environment may be referred to as the location of the device in the first position, or the location of the first position. The device can determine, based on the set of coordinates for the feature, a pose of the device while the device is in the first position. The pose of the device can include at least one of a pitch of the device, a roll of the device, a yaw of the device, or a combination thereof. In some cases, the pose of the device can also include the set of coordinates of the first position of the device within the environment.

At operation 1715, the device identifies that a feature of the environment is depicted in both the first image and the second image. The feature may be a feature of the environment that is visually detectable and/or recognizable in the first image and in the second image. For example, the feature can include at least one of an edge or a corner.

At operation 1720, the device determines a set of coordinates of the feature based on a first depiction of the feature in the first image and a second depiction of the feature in the second image. The set of coordinates of the feature can include three coordinates corresponding to three spatial dimensions. Determining the set of coordinates for the feature can include determining a transformation between a first set of coordinates for the feature corresponding to the first image and a second set of coordinates for the feature corresponding to the second image.

At operation 1725, the device updates a map of the environment based on the set of coordinates for the feature. The device can generate the map of the environment before updating the map of the environment at operation 1725, for instance if the map has not yet been generated. Updating the map of the environment based on the set of coordinates for the feature can include adding a new map area to the map. The new map area can include the set of coordinates for the feature. Updating the map of the environment based on the set of coordinates for the feature can include revising a map area of the map (e.g., revising an existing map area already at least partially represented in the map). The map area can include the set of coordinates for the feature. Revising the map area may include revising a previous set of coordinates of the feature based on the set of coordinates of the feature. For instance, if the set of coordinates of the feature is more accurate than the previous set of coordinates of the feature, then revising the map area can include replacing the previous set of coordinates of the feature with the set of coordinates of the feature. Revising the map area can include replacing the previous set of coordinates of the feature with an averaged set of coordinates of the feature. The device can determine the averaged set of coordinates of the feature by averaging the previous set of coordinates of the feature with the set of coordinates of the feature (and/or one or more additional sets of coordinates of the feature).

In some cases, the device can identify that the device has moved from the first position to a second position. The device can receive a third image of the environment captured by the second camera while the device is in the second position. The device can identify that the feature of the environment is depicted in at least one of the third image and a fourth image from the first camera. The device can track the feature based on one or more depictions of the feature in at least one of the third image and the fourth image. The device can determine, based on tracking the feature, a set of coordinates of the second position of the device within the environment. The device can determine, based on tracking the feature, a pose of the device while the device is in the second position. The pose of the device can include at least one of a pitch of the device, a roll of the device, a yaw of the device, or a combination thereof. In some cases, the pose of the device can include the set of coordinates of the second position of the device within the environment. The device can generate an updated set of coordinates of the feature in the environment by updating the set of coordinates of the feature in the environment based on tracking the feature. The device can update the map of the environment based on the updated set of coordinates of the feature. Tracking the feature can be based on at least one of the set of coordinates of the feature, the first depiction of the feature in the first image, and the second depiction of the feature in the second image.

The environment can be well-illuminated, for instance via sunlight, moonlight, and/or artificial lighting. The device can identify that an illumination level of the environment is above a minimum illumination threshold while the device is in the second position. Based on the illumination level being above the minimum illumination threshold, the device can receive the fourth image of the environment captured by the first camera while the device is in the second position. In such cases, tracking the feature is based on a third depiction of the feature in the third image and on a fourth depiction of the feature in the fourth image.

The environment can be poorly-illuminated, for instance via lack of sunlight, lack of moonlight, dim moonlight, lack of artificial lighting, and/or dim artificial lighting. The device can identify that an illumination level of the environment is below a minimum illumination threshold while the device is in the second position. Based on the illumination level being below the minimum illumination threshold, tracking the feature can be based on a third depiction of the feature in the third image.

The device can identify that the device has moved from the first position to a second position. The device can receive a third image of the environment captured by the second camera while the device is in the second position. The device can identify that a second feature of the environment is depicted in at least one of the third image and a fourth image from the first camera. The device can determine a second set of coordinates for the second feature based on one or more depictions of the second feature in at least one of the third image and the fourth image. The device can update the map of the environment based on the second set of coordinates for the second feature. The device can determine, based on updating the map, a set of coordinates of the second position of the device within the environment. The device can determine, based on updating the map, a pose of the device while the device is in the second position. The pose of the device can include at least one of a pitch of the device, a roll of the device, a yaw of the device, or a combination thereof. In some cases, the pose of the device can also include the set of coordinates of the second position of the device within the environment.

The environment can be well-illuminated. The device can identify that an illumination level of the environment is above a minimum illumination threshold while the device is in the second position. Based on the illumination level being above the minimum illumination threshold, the device can receive the fourth image of the environment captured by the first camera while the device is in the second position. In such cases, determining the second set of coordinates of the second feature is based on a first depiction of the second feature in the third image and on a second depiction of the second feature in the fourth image.

The environment can be poorly-illuminated. The device can identify that an illumination level of the environment is below a minimum illumination threshold while the device is in the second position. Based on the illumination level being below the minimum illumination threshold, determining the second set of coordinates for the second feature can be based on a first depiction of the second feature in the third image.

The first camera can have a first frame rate, and the second camera can have a second frame rate. The first frame rate may be different from (e.g., greater than or less than) the second frame rate. The first frame rate can be the same as the second frame rate. An effective frame rate of the device can refer to how many frames are coming in from all activated cameras per second (or per other unit of time). The device can have a first effective frame rate while both the first camera and the second camera are activated, for example while the illumination level of the environment exceeds the minimum illumination threshold. The device can have a second effective frame rate while only one of two cameras (e.g., only the first camera or only the second camera) is activated, for example while the illumination level of the environment falls below the minimum illumination threshold. The first effective frame rate of the device can exceed the second effective frame rate of the device.

In some cases, at least a subset of the techniques illustrated by the flow diagram 1700 and by the conceptual diagrams 200, 300, 400, 800, 900, 1000, 1050, 1100, 1200, 1300, 1350, 1400, 1450, 1500, and 1600 may be performed by the device discussed with respect to FIG. 17. In some cases, at least a subset of the techniques illustrated by the flow diagram 1700 and by the conceptual diagrams 200, 300, 400, 800, 900, 1000, 1050, 1100, 1200, 1300, 1350, 1400, 1450, 1500, and 1600 may be performed by one or more network servers of a cloud service. In some examples, at least a subset of the techniques illustrated by the flow diagram 1700 and by the conceptual diagrams 200, 300, 400, 800, 900, 1000, 1050, 1100, 1200, 1300, 1350, 1400, 1450, 1500, and 1600 can be performed by an image capture and processing system 100, an image capture device 105A, an image processing device 105B, a VSLAM device 205, a VSLAM device 305, a UGV 610, a UAV 620, an XR headset 710, one or more remote servers, one or more network servers of a cloud service, a computing system 1800, or some combination thereof. The computing system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing system, device, or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing system, device, or apparatus may include a display, a network interface configured to communicate and/or receive the data, any combination thereof, and/or other component(s). The network interface may be configured to communicate and/or receive Internet Protocol (IP) based data or other type of data.

The components of the computing system, device, or apparatus can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by the flow diagram 1700 and by the conceptual diagrams 200, 300, 400, and 1200 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, at least a subset of the techniques illustrated by the flow diagram 1700 and by the conceptual diagrams 200, 300, 400, 800, 900, 1000, 1050, 1100, 1200, 1300, 1350, 1400, 1450, 1500, and 1600 described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 18:
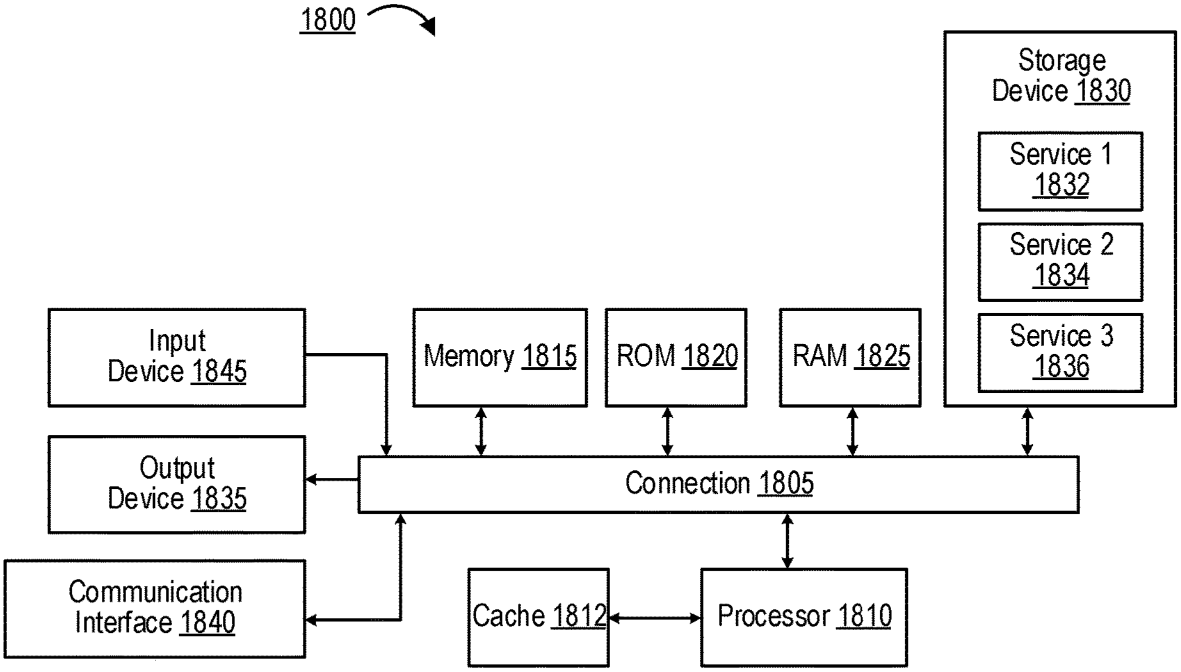
FIG. 18 is a diagram illustrating an example of a system for implementing certain aspects of the present technology.

FIG. 18 is a diagram illustrating an example of a system for implementing certain aspects of the present technology. In particular, FIG. 18 illustrates an example of computing system 1800, which can be for example any computing device making up internal computing system, a remote computing system, a camera, or any component thereof in which the components of the system are in communication with each other using connection 1805. Connection 1805 can be a physical connection using a bus, or a direct connection into processor 1810, such as in a chipset architecture. Connection 1805 can also be a virtual connection, networked connection, or logical connection.

In some embodiments, computing system 1800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1800 includes at least one processing unit (CPU or processor) 1810 and connection 1805 that couples various system components including system memory 1815, such as read-only memory (ROM) 1820 and random access memory (RAM) 1825 to processor 1810. Computing system 1800 can include a cache 1812 of high-speed memory connected directly with, in close proximity to, or integrated as part of processor 1810.

Processor 1810 can include any general purpose processor and a hardware service or software service, such as services 1832, 1834, and 1836 stored in storage device 1830, configured to control processor 1810 as well as a special-purpose processor where software instructions are incorporated into the actual processor design. Processor 1810 may essentially be a completely self-contained computing system, containing multiple cores or processors, a bus, memory controller, cache, etc. A multi-core processor may be symmetric or asymmetric.

To enable user interaction, computing system 1800 includes an input device 1845, which can represent any number of input mechanisms, such as a microphone for speech, a touch-sensitive screen for gesture or graphical input, keyboard, mouse, motion input, speech, etc. Computing system 1800 can also include output device 1835, which can be one or more of a number of output mechanisms. In some instances, multimodal systems can enable a user to provide multiple types of input/output to communicate with computing system 1800. Computing system 1800 can include communications interface 1840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1840 may also include one or more Global Navigation Satellite System (GNSS) receivers or transceivers that are used to determine a location of the computing system 1800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1830 can include software services, servers, services, etc., that when the code that defines such software is executed by the processor 1810, it causes the system to perform a function. In some embodiments, a hardware service that performs a particular function can include the software component stored in a computer-readable medium in connection with the necessary hardware components, such as processor 1810, connection 1805, output device 1835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” means A, B, or A and B. In another example, claim language reciting “at least one of A, B, and C” means A, B, C, or A and B, or A and C, or B and C, or A and B and C. The language “at least one of” a set and/or “one or more” of a set does not limit the set to the items listed in the set. For example, claim language reciting “at least one of A and B” can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for processing image data, the apparatus comprising:

at least one memory; and at least one processor coupled to the at least one memory, the at least one processor configured to:

receive a first image of an environment captured by a first image sensor that is responsive to a first spectrum of light;

receive a second image of the environment captured by a second image sensor that is responsive to a second spectrum of light, wherein the first spectrum of light and the second spectrum of light are at least partially different from one another;

identify that a first feature of the environment is depicted in both the first image and the second image, and that a second feature of the environment is identifiable in the first image but not in the second image;

determine a first set of coordinates of the first feature based on the first feature as depicted in the first image and the second image, and a second set of coordinates of the second feature based on the second feature as depicted in the first image, wherein the first set of coordinates corresponds to a first confidence value that is higher than a second confidence value corresponding to the second set of coordinates based on the first feature being depicted in the first image and the second image; and update a map of the environment based on the first set of coordinates and the first confidence value for the first feature and based on the second set of coordinates and the second confidence value for the second feature.

2. The apparatus of claim 1, wherein the apparatus is at least one of a mobile handset, a head-mounted display (HMD), a vehicle, and a robot.

3. The apparatus of claim 1, wherein the apparatus includes at least one of the first image sensor and the second image sensor.

4. The apparatus of claim 1, wherein the first spectrum of light is at least part of a visible light (VL) spectrum, and the second spectrum of light is distinct from the VL spectrum.

5. The apparatus of claim 1, wherein the second spectrum of light is at least part of an infrared (IR) light spectrum, and the first spectrum of light is distinct from the IR light spectrum.

6. The apparatus of claim 1, wherein the first set of coordinates of the first feature includes three coordinates corresponding to three spatial dimensions.

7. The apparatus of claim 1, wherein the first image sensor captures the first image while the apparatus is in a first position, and wherein the second image sensor captures the second image while the apparatus is in the first position.

8. The apparatus of claim 7, wherein the at least one processor is configured to:

determine, based on the first set of coordinates of the first feature and the second set of coordinates of the second feature, a set of coordinates of the first position of the apparatus within the environment.

9. The apparatus of claim 7, wherein the at least one processor is configured to:

determine, based on the first set of coordinates of the first feature and the second set of coordinates of the second feature, a pose of the apparatus while the apparatus is in the first position, wherein the pose of the apparatus includes at least one of a pitch of the apparatus, a roll of the apparatus, or a yaw of the apparatus.

10. The apparatus of claim 7, wherein the at least one processor is configured to:

identify that the apparatus has moved from the first position to a second position;

receive a third image of the environment captured by the second image sensor while the apparatus is in the second position;

identify that the first feature of the environment is depicted in at least one of the third image or a fourth image from the first image sensor; and track the first feature based on the first feature as depicted in the at least one of the third image or the fourth image.

11. The apparatus of claim 10, wherein the at least one processor is configured to:

determine, based on tracking the first feature, a set of coordinates of the second position of the apparatus within the environment.

12. The apparatus of claim 10, wherein the at least one processor is configured to:

determine, based on tracking the first feature, a pose of the apparatus while the apparatus is in the second position, wherein the pose of the apparatus includes at least one of a pitch of the apparatus, a roll of the apparatus, or a yaw of the apparatus.

13. The apparatus of claim 10, wherein the at least one processor is configured to:

generating an updated set of coordinates of the first feature in the environment by updating the first set of coordinates of the first feature in the environment based on tracking the first feature; and updating the map of the environment based on the updated set of coordinates of the first feature.

14. The apparatus of claim 10, wherein the at least one processor is configured to:

identify that an illumination level of the environment is above a minimum illumination threshold while the apparatus is in the second position; and receive the fourth image of the environment captured by the first image sensor while the apparatus is in the second position, wherein tracking the first feature is based on the first feature as depicted in the third image and in the fourth image.

15. The apparatus of claim 10, wherein the at least one processor is configured to:

identify that an illumination level of the environment is below a minimum illumination threshold while the apparatus is in the second position, wherein tracking the first feature is based on the first feature as depicted in the third image.

16. The apparatus of claim 10, wherein tracking the first feature is also based on at least one of the first set of coordinates of the first feature, the first feature as depicted in the first image, or the first feature as depicted in the second image.

17. The apparatus of claim 7, wherein the at least one processor is configured to:

identify that the apparatus has moved from the first position to a second position;

receive a third image of the environment captured by the second image sensor while the apparatus is in the second position;

identify that a third feature of the environment is depicted in at least one of the third image or a fourth image from the first image sensor;

determine a third set of coordinates for the third feature based on the third feature as depicted in at least one of the third image and the fourth image; and update the map of the environment based on the third set of coordinates for the third feature.

18. The apparatus of claim 17, wherein the at least one processor is configured to:

determine, based on updating the map, a set of coordinates of the second position of the apparatus within the environment.

19. The apparatus of claim 17, wherein the at least one processor is configured to:

determine, based on updating the map, a pose of the apparatus while the apparatus is in the second position, wherein the pose of the apparatus includes at least one of a pitch of the apparatus, a roll of the apparatus, or a yaw of the apparatus.

20. The apparatus of claim 17, wherein the at least one processor is configured to:

identify that an illumination level of the environment is above a minimum illumination threshold while the apparatus is in the second position; and receive the fourth image of the environment captured by the first image sensor while the apparatus is in the second position, wherein determining the third set of coordinates of the third feature is based on the third feature as depicted in the third image and in the fourth image.

21. The apparatus of claim 17, wherein the at least one processor is configured to:

identify that an illumination level of the environment is below a minimum illumination threshold while the apparatus is in the second position, wherein determining the third set of coordinates for the third feature is based on the third feature as depicted in the third image.

22. The apparatus of claim 1, wherein determining the first set of coordinates for the first feature includes determining a transformation between a third set of coordinates for the first feature corresponding to the first image and a fourth set of coordinates for the first feature corresponding to the second image.

23. The apparatus of claim 1, wherein the at least one processor is configured to:

generate the map of the environment before updating the map of the environment.

24. The apparatus of claim 1, wherein updating the map of the environment based on the first set of coordinates for the first feature and the second set of coordinates for the second feature includes adding a new map area to the map, the new map area including at least one of the first set of coordinates for the first feature or the second set of coordinates for the second feature.

25. The apparatus of claim 1, wherein updating the map of the environment based on the first set of coordinates for the first feature and the second set of coordinates for the second feature includes revising a map area of the map, the map area including at least one of the first set of coordinates for the first feature or the second set of coordinates for the second feature.

26. The apparatus of claim 1, wherein the first feature is at least one of an edge or a corner.

27. A method of processing image data, the method comprising:

receiving a first image of an environment captured by a first image sensor that is-responsive to a first spectrum of light;

receiving a second image of the environment captured by a second image sensor that is responsive to a second spectrum of light, wherein the first spectrum of light and the second spectrum of light are at least partially different from one another;

identifying that a first feature of the environment is depicted in both the first image and the second image, and that a second feature of the environment is identifiable in the first image but not in the second image;

determining a first set of coordinates of the first feature based on the first feature as depicted in the first image and the second image, and a second set of coordinates of the second feature based on the second feature as depicted in the first image, wherein the first set of coordinates corresponds to a first confidence value that is higher than a second confidence value corresponding to the second set of coordinates based on the first feature being depicted in the first image and the second image; and updating a map of the environment based on the first set of coordinates and the first confidence value for the first feature and based on the second set of coordinates and the second confidence value for the second feature.

28. The method of claim 27, wherein the first spectrum of light is at least part of a visible light (VL) spectrum, and the second spectrum of light is distinct from the VL spectrum.

29. The method of claim 27, wherein the second spectrum of light is at least part of an infrared (IR) light spectrum, and the first spectrum of light is distinct from the IR light spectrum.

30. The method of claim 27, wherein the first set of coordinates of the first feature includes three coordinates corresponding to three spatial dimensions.

31. The method of claim 27, wherein a device includes the first image sensor and the second image sensor, wherein the first image sensor captures the first image while the device is in a first position, and wherein the second image sensor captures the second image while the device is in the first position.

32. The method of claim 31, further comprising:

determining, based on the first set of coordinates for the first feature, a set of coordinates of the first position of the device within the environment.

33. The method of claim 31, further comprising:

determining, based on the first set of coordinates for the first feature, a pose of the device while the device is in the first position, wherein the pose of the device includes at least one of a pitch of the device, a roll of the device, or a yaw of the device.

34. The method of claim 31, further comprising:

identifying that the device has moved from the first position to a second position;

receiving a third image of the environment captured by the second image sensor while the device is in the second position;

identifying that the first feature of the environment is depicted in at least one of the third image or a fourth image from the first image sensor; and tracking the first feature based on the first feature as depicted in the at least one of the third image or the fourth image.

35. The method of claim 34, further comprising:

determining, based on tracking the first feature, a set of coordinates of the second position of the device within the environment.

36. The method of claim 34, further comprising:

determining, based on tracking the first feature, a pose of the device while the device is in the second position, wherein the pose of the device includes at least one of a pitch of the device, a roll of the device, or a yaw of the device.

37. The method of claim 34, further comprising:

generating an updated set of coordinates of the first feature in the environment by updating the first set of coordinates of the first feature in the environment based on tracking the first feature; and updating the map of the environment based on the updated set of coordinates of the first feature.

38. The method of claim 34, further comprising:
identifying that an illumination level of the environment is above a minimum illumination threshold while the device is in the second position; and
receiving the fourth image of the environment captured by the first image sensor while the device is in the second position, wherein tracking the first feature is based on the first feature as depicted in the third image and in the fourth image.

39. The method of claim 34, further comprising:
identifying that an illumination level of the environment is below a minimum illumination threshold while the device is in the second position, wherein tracking the first feature is based on the first feature as depicted in the third image.

40. The method of claim 34, wherein tracking the first feature is also based on at least one of the first set of coordinates of the first feature, the first feature as depicted in the first image, or the first feature as depicted in the second image.

41. The method of claim 31, further comprising:
identifying that the device has moved from the first position to a second position;
receiving a third image of the environment captured by the second image sensor while the device is in the second position;
identifying that a third feature of the environment is depicted in at least one of the third image or a fourth image from the first image sensor;
determining a third set of coordinates for the third feature based on the third feature as depicted in at least one of the third image and the fourth image; and
updating the map of the environment based on the third set of coordinates for the third feature.

42. The method of claim 41, further comprising:
determining, based on updating the map, a set of coordinates of the second position of the device within the environment.

43. The method of claim 41, further comprising:
determining, based on updating the map, a pose of the device while the device is in the second position, wherein the pose of the device includes at least one of a pitch of the device, a roll of the device, or a yaw of the device.

44. The method of claim 41, further comprising:
identifying that an illumination level of the environment is above a minimum illumination threshold while the device is in the second position; and
receiving the fourth image of the environment captured by the first image sensor while the device is in the second position, wherein determining the second set of coordinates of the second feature is based on a first depiction of the second feature in the third image and on a second depiction of the second feature in the fourth image.

45. The method of claim 41, further comprising:
identifying that an illumination level of the environment is below a minimum illumination threshold while the device is in the second position, wherein determining the third set of coordinates of the third feature is based on the third feature as depicted in the third image and in the fourth image.

46. The method of claim 27, wherein determining the first set of coordinates for the first feature includes determining a transformation between a third set of coordinates for the first feature corresponding to the first image and a fourth set of coordinates for the first feature corresponding to the second image.

47. The method of claim 27, further comprising:
generating the map of the environment before updating the map of the environment.

48. The method of claim 27, wherein updating the map of the environment based on the first set of coordinates for the first feature and the second set of coordinates for the second feature includes adding a new map area to the map, the new map area including at least one of the first set of coordinates for the first feature or the second set of coordinates for the second feature.

49. The method of claim 27, wherein updating the map of the environment based on the first set of coordinates for the first feature and the second set of coordinates for the second feature includes revising a map area of the map, the map area including at least one of the first set of coordinates for the first feature or the second set of coordinates for the second feature.

50. The method of claim 27, wherein the first feature is at least one of an edge or a corner.

51. A non-transitory computer readable storage medium having embodied thereon a program, wherein the program is executable by a processor to perform a method of processing image data, the method comprising:
receiving a first image of an environment captured by a first image sensor that is responsive to a first spectrum of light;
receiving a second image of the environment captured by a second image sensor that is responsive to a second spectrum of light, wherein the first spectrum of light and the second spectrum of light are at least partially different from one another;
identifying that a first feature of the environment is depicted in both the first image and the second image, and that a second feature of the environment is identifiable in the first image but not in the second image;
determining a first set of coordinates of the first feature based on the first feature as depicted in the first image and the second image, and a second set of coordinates of the second feature based on the second feature as depicted in the first image, wherein the first set of coordinates corresponds to a first confidence value that is higher than a second confidence value corresponding to the second set of coordinates based on the first feature being depicted in the first image and the second image; and
updating a map of the environment based on the first set of coordinates and the first confidence value for the first feature and based on the second set of coordinates and the second confidence value for the second feature.

52. The apparatus of claim 1, wherein, to determine the set of coordinates of the first feature based on the first feature as depicted in the first image and the second image, the at least one processor is configured to determine the first set of coordinates of the first feature based on the first feature as depicted in the first image and the second image, a first location of the first image sensor, and a second location of the second image sensor.

53. The apparatus of claim 1, wherein the second feature of the environment is identifiable in the first image but not in the second image based on an area of the environment that includes the second feature being represented with a different level of illumination within the second image than within the first image.

* * * * *